US012489218B2

(12) United States Patent
Wu et al.

(10) Patent No.: US 12,489,218 B2
(45) Date of Patent: Dec. 2, 2025

(54) ANTENNA, ANTENNA ARRAY AND COMMUNICATION SYSTEM

(71) Applicants: Beijing BOE Technology Development Co., Ltd., Beijing (CN); BOE Technology GROUP CO., LTD., Beijing (CN)

(72) Inventors: Qianhong Wu, Beijing (CN); Jingwen Guo, Beijing (CN); Chunxin Li, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 12 days.

(21) Appl. No.: 18/272,556

(22) PCT Filed: Jul. 1, 2022

(86) PCT No.: PCT/CN2022/103313
§ 371 (c)(1),
(2) Date: Jul. 14, 2023

(87) PCT Pub. No.: WO2023/005598
PCT Pub. Date: Feb. 2, 2023

(65) Prior Publication Data

US 2024/0072453 A1 Feb. 29, 2024

(30) Foreign Application Priority Data

Jul. 29, 2021 (CN) ......................... 202110864053.8

(51) Int. Cl.
*H01Q 3/34* (2006.01)
*H01P 1/18* (2006.01)
*H01Q 21/00* (2006.01)

(52) U.S. Cl.
CPC ......... *H01Q 21/0006* (2013.01); *H01P 1/182* (2013.01)

(58) Field of Classification Search
CPC . H01P 1/18; H01P 1/182; H01P 1/184; H01Q 21/00; H01Q 21/0006; H01Q 1/22;
(Continued)

(56) References Cited

U.S. PATENT DOCUMENTS 11,677,126 B2 * 6/2023 Guo ......................... H01Q 3/36 343/850
11,870,123 B2 * 1/2024 Guo ......................... H01P 1/18
(Continued)

FOREIGN PATENT DOCUMENTS

CN 1521889 A 8/2004
CN 2657214 Y 11/2004
(Continued)

OTHER PUBLICATIONS

China Patent Office, First Office Action issued Jun. 30, 2023 for application No. CN202110864053.8.
(Continued)

*Primary Examiner* — Tho G Phan
(74) *Attorney, Agent, or Firm* — HOUTTEMAN LAW LLC

(57) ABSTRACT

The present disclosure provides an antenna, an antenna array and a communication system, and belongs to the field of communication technology. The antenna of the present disclosure includes: a phase shifter, including: a dielectric substrate, a first signal electrode, a first reference electrode, a second reference electrode, an interlayer insulating layer, at least one phase control unit; a first transmission structure and a second transmission structure; wherein the first transmission structure is electrically connected to one end of the first signal electrode, and the second transmission structure is electrically connected to the other end of the first signal electrode; and an antenna unit electrically connected to the second transmission structure.

18 Claims, 10 Drawing Sheets

(58) Field of Classification Search
CPC .. H01Q 1/36; H01Q 1/38; H01Q 1/48; H01Q 1/50; H01Q 3/26; H01Q 3/34; H01Q 3/36; H01Q 9/04
See application file for complete search history.

(56) References Cited

U.S. PATENT DOCUMENTS

| | | | | |
|---|---|---|---|---|
| 11,949,141 | B2 * | 4/2024 | Fang | H01P 1/184 |
| 12,166,254 | B2 * | 12/2024 | Li | H01P 1/18 |
| 2020/0343634 | A1 | 10/2020 | Wang et al. | |

FOREIGN PATENT DOCUMENTS

| | | | |
|---|---|---|---|
| CN | 1851972 | A | 10/2006 |
| CN | 101159345 | A | 4/2008 |
| CN | 102117972 | A | 7/2011 |
| CN | 102593588 | A | 7/2012 |
| CN | 103746157 | A | 4/2014 |
| CN | 105450200 | A | 3/2016 |
| CN | 109273842 | A | 1/2019 |
| CN | 110137636 | A | 8/2019 |
| CN | 110824734 | A | 2/2020 |
| CN | 112332049 | A | 2/2021 |
| CN | 112397854 | A | 2/2021 |
| CN | 112397893 | A | 2/2021 |
| CN | 112448105 | A | 3/2021 |
| CN | 112768851 | A | 5/2021 |
| CN | 112787052 | A | 5/2021 |
| CN | 215497017 | U | 1/2022 |
| JP | 2002100906 | A | 4/2002 |
| JP | 2012120119 | A | 6/2012 |
| WO | 2022160157 | A1 | 8/2022 |

OTHER PUBLICATIONS

Devi et al., "A novel design of 4-bit distributed MEMS transmission line (DMTL) phase shifter using an RF shunt capacitive MEMS switch for phased array antenna," Conference Paper, Apr. 23, 2015, pp. 1-6, International Conference for Convergence for Technology—2014.

Das et al., "A novel monolithic integrated phased array antenna using 4-bit distributed MEMS phase shifter and triangular patch antenna." Conference Paper, Oct. 21, 2013, pp. 913-918, 2013 International Conference on Advances in Computing, Communications and Informatics (ICACCI).

Topalli et al. "A monolithic phased array using 3-bit DMTL RF MEMS phase shifters," Conference Paper, Oct. 23, 2006, pp. 517-520, 2006 IEEE Antennas and Propagation Society International Symposium.

* cited by examiner

ANTENNA, ANTENNA ARRAY AND COMMUNICATION SYSTEM

TECHNICAL FIELD

The present disclosure relates to the field of communication technology, and in particular to an antenna, an antenna array and a communication system.

BACKGROUND

A phase shifter is a device capable of adjusting a phase of a wave. The phase shifter has a wide application in the fields of radar, missile attitude control, accelerator, communication, instrument, even music and the like. The traditional phase shifter mainly embodies a ferrite material, a PIN diode or a field effect transistor as a switch. The phase shifter of the ferrite material has a larger power capacity and a relatively low insertion loss, but has a complex process, a high manufacturing cost, a large volume and the like, which limits its large-scale application. A semiconductor phase shifter has a small volume, a high operating speed, but has a smaller power capacity, a larger power consumption and a high process difficulty. Compared to the traditional phase shifter, a micro-electromechanical system (MEMS) phase shifter has the advantages of a small volume, a light weight, a short control time, a low insertion loss, a high loadable power and the like, and thus has great development and application prospects.

SUMMARY

The present disclosure is directed to at least one of the technical problems in the prior art, and provides an antenna, an antenna array and a communication system.

In a first aspect, an embodiment of the present disclosure provides an antenna, including: a phase shifter, including: a dielectric substrate, a first signal electrode, a first reference electrode, a second reference electrode, an interlayer insulating layer, at least one phase control unit; wherein the dielectric substrate includes a first surface and a second surface opposite to each other along a thickness direction of the dielectric substrate; extending directions of the first signal electrode, the first reference electrode, and the second reference electrode are the same; and the first signal electrode, the first reference electrode, and the second reference electrode are all on the first surface of the dielectric substrate, the first reference electrode and the second reference electrode are respectively on both sides of the first signal electrode; the interlayer insulating layer is on a side of the first signal electrode, the first reference electrode and the second reference electrode away from the dielectric substrate; each of the at least one phase control unit includes at least one membrane bridge on a side of the interlayer insulating layer away from the dielectric substrate; the first signal electrode is in a space surrounded by the at least one membrane bridge and the dielectric substrate, and two ends of each membrane bridge overlap with orthographic projections of the first reference electrode and the second reference electrode on the dielectric substrate, respectively; a first transmission structure and a second transmission structure; wherein the first transmission structure is electrically connected to one end of the first signal electrode, and the second transmission structure is electrically connected to the other end of the first signal electrode; and an antenna unit electrically connected to the second transmission structure.

In some embodiments of the present disclosure, the first transmission structure includes: a second signal electrode, a third reference electrode, and a fourth reference electrode on the first surface of the dielectric substrate and having a same extending direction, wherein the third reference electrode and the fourth reference electrode are respectively on two sides of the second signal electrode; the second signal electrode is electrically connected to the first signal electrode; and the second transmission structure includes: a third signal electrode, a fifth reference electrode and a sixth reference electrode on the first surface of the dielectric substrate and having a same extending direction, wherein the fifth reference electrode and the sixth reference electrode are respectively on two sides of the third signal electrode; the third signal electrode is electrically connected to the first signal electrode.

In some embodiments of the present disclosure, the antenna unit includes a radiation patch on the first surface of the dielectric substrate, and a seventh reference electrode on the second surface of the dielectric substrate; orthographic projections of the radiation patch and the seventh reference electrode on the dielectric substrate at least partially overlap with each other; and the third signal electrode is electrically connected to the radiation patch.

In some embodiments of the present disclosure, the fifth reference electrode includes a first main body portion and a first protrusion portion connected to a side of the first main body portion close to the radiation patch; the sixth ground electrode includes a second main body portion and a second protrusion portion connected to a side of the second main body portion close to the radiation patch; and orthographic projections of the first protrusion portion and the second protrusion portion on the dielectric substrate at least partially overlap with an orthographic projection of the seventh ground electrode on the dielectric substrate.

In some embodiments of the present disclosure, the first main body portion and the first protrusion portion are a unitary structure; and the second main body portion and the second protrusion portion are a unitary structure.

In some embodiments of the present disclosure, the antenna further includes: a first adapter structure; wherein the first adapter structure includes a fourth signal electrode, an eighth reference electrode and a ninth reference electrode on the dielectric substrate and having a same extending direction; the eighth reference electrode and the ninth reference electrode are respectively on two opposite sides of the fourth signal electrode; the fourth signal electrode is electrically connected to the second signal electrode; and a distance between the eighth reference electrode and the ninth reference electrode is greater than that between the third reference electrode and the fourth reference electrode.

In some embodiments of the present disclosure, the adapter structure further includes a tenth reference electrode on the second surface of the dielectric substrate; and orthographic projections of the fourth signal electrode, the eighth reference electrode and the ninth reference electrode on the dielectric substrate at least partially overlap with an orthographic projection of the tenth reference electrode on the dielectric substrate.

In some embodiments of the present disclosure, the eighth reference electrode and the ninth reference electrode are electrically connected to the tenth reference electrode through vias extending through the dielectric substrate, respectively.

In some embodiments of the present disclosure, the third reference electrode and the eighth reference electrode are a unitary structure; the fourth reference electrode and the ninth reference electrode are a unitary structure; and the second signal electrode and the fourth signal electrode are a unitary structure.

In some embodiments of the present disclosure, the antenna further includes at least one direct current bias line; wherein the at least one membrane bridge in each phase control unit is connected to one corresponding direct current bias line.

In some embodiments of the present disclosure, the antenna further includes a first switch unit on the dielectric substrate for providing a bias voltage signal to the at least one membrane bridge upon receiving a first control signal.

In some embodiments of the present disclosure, the first switch unit includes a first switch transistor having a first electrode serving as a bias voltage input terminal of the first switch unit and a second electrode serving as a first output terminal of the first switch unit, and a control electrode serving as a first control terminal of the first switch unit, and the first switch transistor is capable of conducting the first electrode and the second electrode when the control electrode receives the first control signal.

In some embodiments of the present disclosure, the antenna further includes a second switch unit on the dielectric substrate for electrically connecting the signal electrode with the membrane bridges upon receiving a second control signal.

In some embodiments of the present disclosure, the first switch unit is further configured to electrically connect the signal electrode with the membrane bridges upon receiving a second control signal.

In some embodiments of the present disclosure, the at least one phase control unit includes a plurality of phase control units and the number of the membrane bridges in at least some of the plurality of phase control units is different.

In a second aspect, an embodiment of the present disclosure provides an antenna array, which includes at least one antenna module each including the antenna.

In some embodiments of the present disclosure, each antenna module further includes a feed structure electrically connected to the antenna.

In some embodiments of the present disclosure, the feed structure includes a feed network on the first surface of the dielectric substrate and an eleventh ground electrode on the second surface of the dielectric substrate; an orthographic projection of the feed network on the dielectric substrate overlaps with an orthographic projection of the eleventh ground electrode on the dielectric substrate; and each antenna module includes $2^n$ antennas, the feed network includes n-stage transmission lines; a transmission line at the 1st stage is connected to two adjacent antennas, and antennas connected to different transmission lines at the 1st stage are different; one transmission line at the mth stage is connected to two adjacent transmission lines at the (m−1)th stage, and the transmission lines at the (m−1)th stage connected to different transmission lines at the mth stage are different; where $n \geq 2$, $2 \leq m \leq n$, and both m and n are integers.

In some embodiments of the present disclosure, the feed structure is integrated on a printed circuit board and is bonded and connected to each antenna module.

In some embodiments of the present disclosure, the feed structure is electrically connected to the antenna in each antenna module through a connector.

In some embodiments of the present disclosure, the antenna array includes two antenna modules arranged in mirror symmetry; and regions where the antenna units in the two antenna modules are located are adjacent to each other.

In a third aspect, an embodiment of the present disclosure provides a communication system, which includes the antenna array.

DETAIL DESCRIPTION OF EMBODIMENTS

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
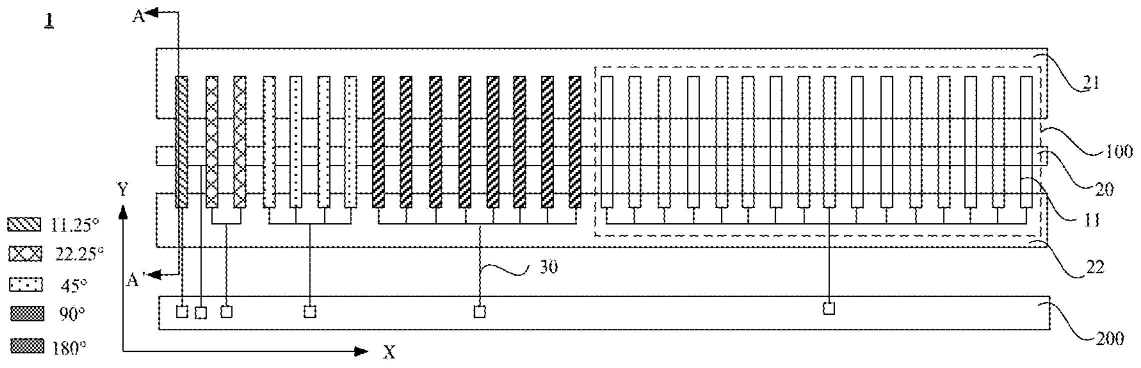
FIG. 1 is a structure of an exemplary phase shifter.
Figure 2:
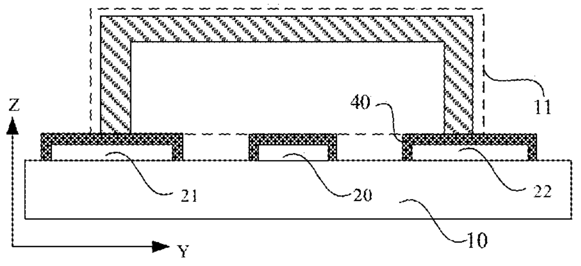
FIG. 2 is a sectional view taken along a line A-A' of the phase shifter of FIG. 1.

FIG. 1 is an exemplary structure of a phase shifter. FIG. 2 is a sectional view taken along a line A-A' of the phase shifter of FIG. 1. As shown in FIGS. 1 and 2, the phase shifter is a MEMS (micro-electro-mechanical system) phase shifter, which includes a first dielectric substrate 10, a first reference electrode, a second reference electrode, a first signal electrode 20, an interlayer insulating layer 40, a plurality of phase control units 100, a control unit 200, and a direct current bias line 30.

Specifically, the first signal electrode 20 is disposed on the first dielectric substrate 10 and extends along a first direction X; the first reference electrode and the second reference electrode also extend along the first direction X, and the first reference electrode and the second reference electrode are respectively disposed on two sides of the first signal electrode 20; the extending directions of the first reference electrode and the second reference electrode may be the same as that of the first signal electrode 20, or may intersect the extending direction of the first signal electrode 20; for the phase shifter with a smaller size, preferably, the extending directions of the first reference electrode and the second reference electrode are set to be the same as that of the first signal electrode 20. In the embodiment of the present disclosure, as an example, the first reference electrode, the second reference electrode, and the first signal electrode 20 extend along the first direction X for description. The first signal electrode 20, the first reference electrode and the second reference electrode may be disposed in a same layer and made of a same material, and the first reference electrode and the second reference electrode include, but are not limited to, ground electrodes. In the embodiments of the present disclosure, as an example, the first reference electrode and the second reference electrode are ground electrodes for description. For convenience of description, the first reference electrode is taken as a first ground electrode 21, and the second reference electrode is taken as a second ground electrode 22. The interlayer insulating layer 40 is disposed on a side of the layer, where the first signal electrode 20, the first ground electrode 21 and the second ground electrode 22 are located, away from the first dielectric substrate 10, and the interlayer insulating layer 40 at least covers the first signal electrode 20, the first ground electrode 21 and the second ground electrode 22.

The plurality of phase control units 100 are arranged on a side of the interlayer insulating layer 40 away from the first dielectric substrate 10. Each phase control unit 100 includes at least one membrane bridge 11; each membrane bridge 11 is bridged between (is connected across) the first ground electrode 21 and the second ground electrode 22. Specifically, each membrane bridge 11 is an arch structure, and includes a bridge floor structure, a first connecting wall and a second connecting wall connected to two ends of the bridge floor structure, the first connecting wall is located on a portion of the insulating layer on the first reference electrode, the second connecting wall is located on a portion of the insulating layer on the second reference electrode, and the bridge floor structure extends along a second direction Y, wherein the second direction Y intersects with the first direction X, for example, the first direction X and the second direction Y are perpendicular to each other. At least part of the first signal electrode 20 is located in a space between the bridge floor structure and the first dielectric substrate 10. Each membrane bridge 11 is electrically connected to a direct current bias line 30 corresponding to the membrane bridge 11, and the bias voltage lines to which the membrane bridges 11 in each phase control unit 100 are connected together and connected to the control unit 200. The first signal electrode 20 is also electrically connected to the direct current bias lines 30, bias voltages are applied to the first signal electrode 20 and the membrane bridges 11. A voltage difference control is achieved by applying a high potential to the first signal electrode 20 and applying a high potential or a low potential to the membrane bridges 11. The selection of the high potential or the low potential of the membrane bridges 11 is achieved by the control unit 200. When the control unit 200 controls the direct current bias lines 30 to apply a high potential to the membrane bridges 11, each membrane bridge 11 is suspended over the first signal electrode 20 without contacting the portion of the interlayer insulating layer 40 on the first signal electrode 20. The bridge floor structure of the membrane bridge 11 has certain elasticity, and the control unit 200 inputs a low potential to the membrane bridge 11, so that the bridge floor structure of the membrane bridge 11 may be driven to move in a direction perpendicular to the first signal electrode 20, that is, the low potential is input to the membrane bridge 11, so that a distance between the bridge floor structure of the membrane bridge 11 and the first signal electrode 20 may be changed, and a capacitance of a capacitor formed by the bridge floor structure of the membrane bridge 11 and the first signal electrode 20 may be changed. However, different phase control units 100 include the membrane bridges 11 with different numbers, and the membrane bridges 11 and the first signal electrodes 20 with a direct current bias voltage applied generate the distributed capacitances with different magnitudes, so that the correspondingly adjusted phase shift amounts are different, that is, each phase control unit 100 adjusts a corresponding phase shift amount (the membrane bridges 11 in the same filling pattern in FIG. 1 means that they belong to the same phase control unit 100), so that when the phase shift amount is adjusted, each phase control unit 100 is controlled to be applied with the voltage according to the corresponding phase shift amount to be adjusted.

Figure 3:
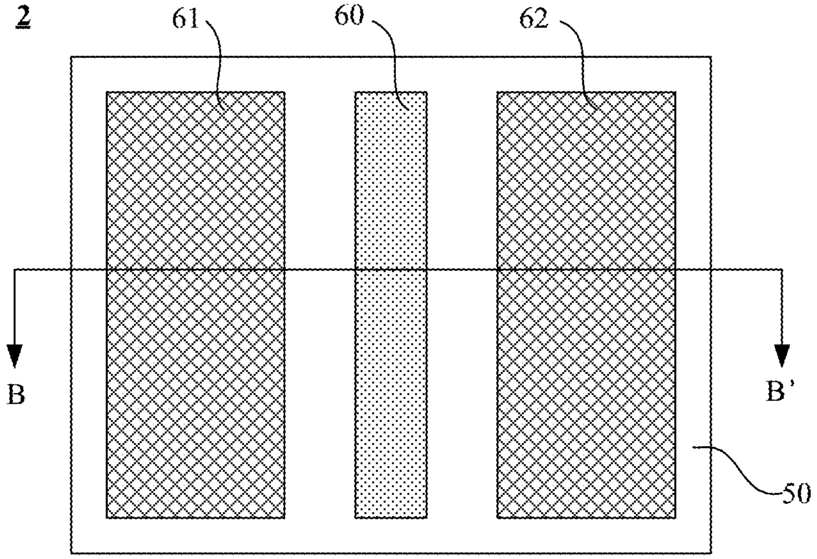
FIG. 3 is a schematic diagram of an exemplary CPW (coplanar waveguide) transmission structure.
Figure 4:
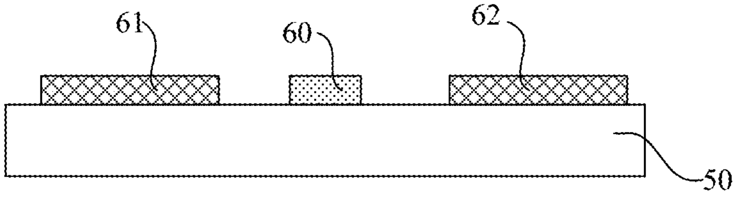
FIG. 4 is a sectional view taken along a line B-B' of FIG. 3.

FIG. 3 is a schematic diagram of an exemplary CPW (coplanar waveguide) transmission structure. FIG. 4 is a sectional view taken along a line B-B' of FIG. 3. As shown in FIGS. 3 and 4, the transmission structure includes a second dielectric substrate 50, a second signal electrode 60, a third reference electrode, and a fourth reference electrode disposed on the second dielectric substrate 50; extending directions of the second signal electrode 60, the third reference electrode and the fourth reference electrode are the same, and the third reference electrode and the fourth reference electrode are respectively arranged on two sides of the second signal electrode 60. In some examples, the second signal electrode 60, the third reference electrode, and the fourth reference electrode are disposed in the same layer and are made of the same material. The third reference electrode and the fourth reference electrode include, but are not limited to, a ground electrode. In the embodiments of the present disclosure, as an example, the third reference electrode and the fourth reference electrode are ground electrodes for description. For convenience of description, the third reference electrode is taken as a third ground electrode 61, and the fourth reference electrode is taken as a fourth ground electrode 62. The second signal electrode 60, the third ground electrode 61, and the fourth ground electrode 62 constitute the CPW transmission structure, and a microwave signal may be transmitted to the first signal electrode 20 of the phase shifter shown in FIG. 1 through the second signal electrode 60. Alternatively, the CPW signal transmission structure may be connected to an antenna unit, and radiate the microwave signal phase-shifted by the phase shifter through the antenna unit, or transmit the microwave signal received by the antenna unit to the phase shifter for phase shifting.

Before describing the technical solutions of the embodiments of the present disclosure, it should be noted that the reference electrodes mentioned in the embodiments of the present disclosure all are ground electrodes for the sake of the simplicity of time sequence and convenience of control. Accordingly, the first reference electrode is the first ground electrode, the second reference electrode is the second ground electrode, the third reference electrode is the third ground electrode, the fourth reference electrode is the fourth ground electrode, a fifth reference electrode is a fifth ground electrode, a sixth reference electrode is a sixth ground electrode, a seventh reference electrode is a seventh ground electrode, an eighth reference electrode is an eighth ground electrode, a ninth reference electrode is a ninth ground electrode, a tenth reference electrode is a tenth ground electrode, and an eleventh reference electrode is an eleventh ground electrode. It is understood that voltage signals, which are all ground signals, are written to the first, second, third, fourth, fifth, sixth, seventh, eighth, ninth, tenth and eleventh ground electrodes.

Figure 5:
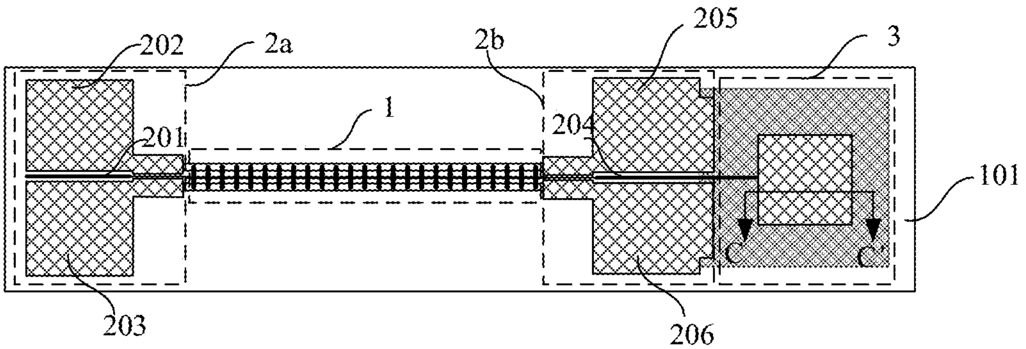
FIG. 5 is a schematic diagram of a structure of an antenna according to an embodiment of the present disclosure.

In a first aspect, FIG. 5 is a schematic diagram of a structure of an antenna according to an embodiment of the present disclosure. As shown in FIG. 5, an embodiment of the present disclosure provides an antenna, including: a phase shifter 1, a first transmission structure 2*a*, a second transmission structure 2*b* and an antenna unit 3. The phase shifter 1 may be an MEMS phase shifter 1. Specifically, the phase shifter 1 may be the phase shifter shown in FIG. 1, and may include the dielectric substrate 101, the first signal electrode 20, the first ground electrode 21, the second ground electrode 22, the interlayer insulating layer 40, the at least one phase control unit 100; the dielectric substrate 101 includes a first surface and a second surface oppositely arranged along a thickness direction of the dielectric substrate 101; the first signal electrode 20, the first ground electrode 21, and the second ground electrode 22 are all disposed on the first surface of the dielectric substrate 101, and the extending directions of the first signal electrode 20, the first ground electrode 21, and the second ground electrode 22 are the same. The first ground electrode 21 and the second ground electrode 22 are respectively disposed on both sides of the first signal electrode 20; the interlayer insulating layer 40 is arranged on a side of the first signal electrode 20, the first ground electrode 21 and the second ground electrode 22 away from the dielectric substrate 101; each phase control unit 100 includes at least one membrane bridge 11 located on a side of the interlayer insulating layer 40 away from the dielectric substrate 101; the first signal electrode 20 is located in a space surrounded by the at least one membrane bridge 11 and the dielectric substrate 101, and (orthographic projections of) two ends of each membrane bridge 11 (on the dielectric substrate 10) overlap with orthographic projections of the first ground electrode 21 and the second ground electrode 22 on the dielectric substrate 101, respectively. The first transmission structure 2*a* and the second transmission structure 2*b* are electrically connected to two opposite ends of the first signal electrode 20 in the extending direction of the first signal electrode 20, respectively. The antenna unit 3 is electrically connected to the second transmission structure 2*b*.

It should be noted that the antenna may be a transmitting antenna or a receiving antenna. If the antenna is used as a transmitting antenna, the first transmission structure 2*a* may receive a microwave signal fed by a feed-forward circuit (e.g., a cable, a power division feed network, etc.), and then input the microwave signal to the first signal electrode 20, the second transmission structure 2*b* receives the microwave signal and then transmits the microwave signal to the antenna unit 3, and the antenna unit 3 emits the signal. If the antenna is used as a receiving antenna, the antenna unit 3 receives a signal and then transmits the signal to the second transmission structure 2*b*, the second transmission structure 2*b* receives the signal and then transmits the signal to the first signal electrode 20, and the first transmission structure 2*a* connected to the other end of the first signal electrode 20 receives a microwave signal and then couples the microwave signal back to the feed-forward circuit. For convenience of explanation, as an example, the first transmission structure 2*a* and the second transmission structure 2*b* of the phase shifter 1 are an input terminal and an output terminal, respectively, for description. In addition, in the embodiment of the present disclosure, as an example, the first transmission structure 2*a* and the second transmission structure 2*b* are directly connected to the phase shifter 1. In an actual product, the first transmission structure 2*a* and the second transmission structure 2*b* may also be fed in a slot coupling way or the like. The phase control units 100 in the phase shifter 1 in the embodiment of the present disclosure are arranged along a straight line. In an actual product, each phase control unit 100 may also be bent or spirally arranged.

Because the antenna in the embodiment of the present disclosure includes the MEMS phase shifter 1, the first transmission structure 2*a*, the second transmission structure 2*b*, and the antenna unit 3, when a microwave signal is fed into the first transmission structure 2*a*, the first transmission structure 2*a* transmits the received microwave signal to the MEMS phase shifter 1, the phase shifting of the microwave signal with different phase shifting degrees may be realized by controlling the phase control units 100 in the MEMS phase shifter 1, the phase-shifted microwave signal is fed into the antenna unit 3 through the second transmission structure 2*b*, and then the microwave signal is radiated through the antenna unit 3. In some examples, the first and second transmission structures 2*a* and 2*b* may each be a CPW transmission structure. For example: the first transmission structure 2*a* includes a second signal electrode 201, a third ground electrode 202, and a fourth ground electrode 203 disposed on a base substrate; extending directions of the second signal electrode 201, the third ground electrode 202 and the fourth ground electrode 203 are the same, and the third ground electrode 202 and the fourth ground electrode 203 are respectively located on opposite sides of the second signal electrode 201. The second transmission structure 2*b* includes a third signal electrode 204, a fifth ground electrode 205 and a sixth ground electrode 206 disposed on the base substrate; extending directions of the third signal electrode 204, the fifth ground electrode 205 and the sixth ground electrode 206 are the same, and the fifth ground electrode 205 and the sixth ground electrode 206 are respectively located on two opposite sides of the third signal electrode 204. The first signal electrode 20 in the phase shifter 1 includes a first end and a second end oppositely disposed in the extending direction of the first signal electrode 20, and the second signal electrode 201 in the first transmission structure 2*a* is connected to the first end of the first signal electrode 20 in the phase shifter 1, to achieve the electrical connection of the first transmission structure 2*a* and the phase shifter 1. Similarly, the third signal electrode 204 in the second transmission structure 2*b* is connected to the second end of the first signal electrode 20 in the phase shifter 1, to achieve the electrical connection of the second transmission structure 2*b* and the phase shifter 1. Alternatively, each of the third ground electrode 202 and the fifth ground electrode 205 may be electrically connected to the first ground electrode 21, and each of the fourth ground electrode 203 and the sixth ground electrode 206 may be electrically connected to the second ground electrode 22.

Further, the first signal electrode 20, the second signal electrode 201, the third signal electrode 204, the first ground electrode 21, the second ground electrode 22, the third ground electrode 202, the fourth ground electrode 203, the fifth ground electrode 205, and the sixth ground electrode 206 may be disposed in the same layer, and be made of the same material. That is, the first signal electrode 20, the second signal electrode 201, the third signal electrode 204, the first ground electrode 21, the second ground electrode 22, the third ground electrode 202, the fourth ground electrode 203, the fifth ground electrode 205, and the sixth ground electrode 206 may be formed in the same patterning process.

Figure 6:
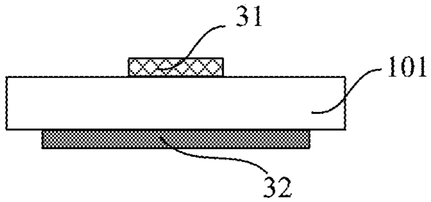
FIG. 6 is a sectional view taken along a line C-C' of FIG. 5.

In some examples, FIG. 6 is a sectional view taken along a line C-C' of FIG. 5, as shown in FIG. 6, the antenna unit 3 may include a radiation patch 31 on the first surface of the dielectric substrate 101 and a seventh ground electrode 32 on the second surface of the dielectric substrate 101; orthographic projections of the radiation patch 31 and the seventh ground electrode 32 on the dielectric substrate 101 at least partially overlap with each other. The radiation patch 31 in the antenna unit 3 is electrically connected to the third signal electrode 204 in the second transmission structure 2*b*. In this way, the microwave signal transmitted via the second transmission structure 2*b* may be fed out through the radiation patch 31 of the antenna. It should be noted that in the embodiment of the present disclosure, only a schematic diagram of a structure of the antenna unit 3 is illustrated, but such the antenna unit 3 does not limit the protection scope of the embodiment of the present disclosure, and the antenna unit 3 may also be a monopole antenna or the like.

Figure 7:
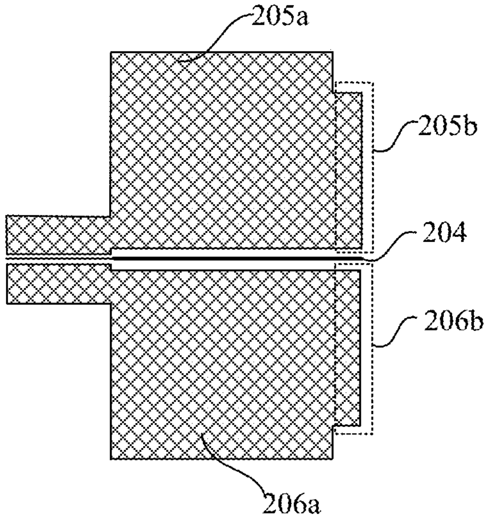
FIG. 7 is a schematic diagram of a structure of a second transmission structure according to an embodiment of the present disclosure.

Further, FIG. 7 is a schematic diagram of a structure of a second transmission structure according to an embodiment of the present disclosure, as shown in FIG. 7, the second transmission structure 2*b* includes not only the CPW transmission structure, but also a GCPW (grounded coplanar waveguide) transmission structure. For example: the fifth ground electrode 205 of the second transmission structure 2*b* includes a first main body portion 205*a* and a first protrusion portion 205*b* connected to a side of the first main body portion 205*a* close to the radiation patch 31; the sixth ground electrode 206 includes a second main body portion 206*a* and a second protrusion portion 206*b* connected to a side of the second main body portion 206*a* close to the radiation patch 31; orthographic projections of the first protrusion portion 205*b* and the second protrusion portion 206*b* on the dielectric substrate 101 at least partially overlap with an orthographic projection of the seventh ground electrode 32 in the antenna unit 3 on the dielectric substrate 101. In this case, the third signal electrode 204, the first main body portion 205*a*, and the second main body portion 206*a* constitute the CPW transmission structure; the third signal electrode 204, the first protrusion portion 205*b*, the second protrusion portion 206*b*, and the seventh ground electrode 32 constitute the GCPW transmission structure. In this way, the microwave signal phase-shifted by the phase shifter 1 may be transmitted to the GCPW transmission structure through the CPW transmission structure, and to the antenna unit 3, so as to feed out the microwave signal through the radiation patch 31 in the antenna unit 3. In this way, the transmission loss of the microwave signals can be reduced, and the radiation efficiency of the microwave signals is improved.

Figure 8:
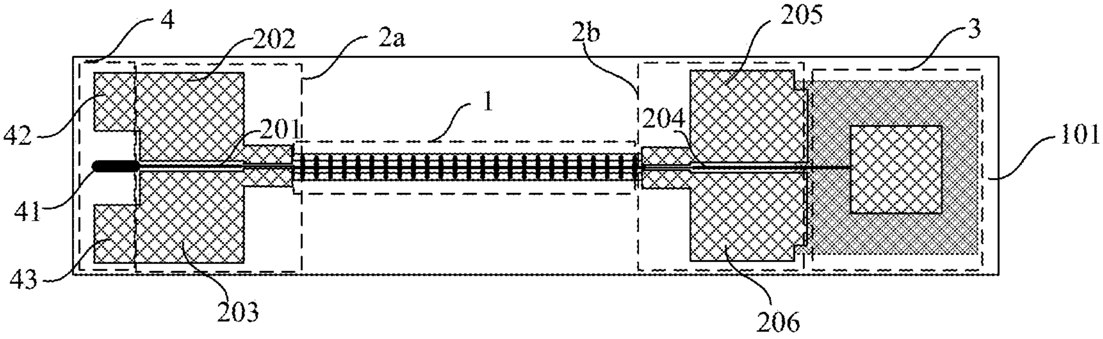
FIG. 8 is a schematic diagram of another structure of an antenna according to an embodiment of the present disclosure.

In some examples, FIG. 8 is a schematic diagram of another structure of an antenna according to an embodiment of the present disclosure, as shown in FIG. 8, the antenna has substantially the same structure as the antenna shown in FIG. 5, except that the antenna includes not only the above structure, but also a first adapter structure 4 electrically connected to the first transmission structure 2*a*. The first adapter structure 4 may be a CPW transmission structure. For example: the first adapter structure 4 may include a fourth signal electrode 41, an eighth ground electrode 42, and a ninth ground electrode 43 disposed on the first surface of the dielectric substrate 101. Extending directions of the fourth signal electrode 41, the eighth ground electrode 42 and the ninth ground electrode 43 are the same, and the eighth ground electrode 42 and the ninth ground electrode 43 are respectively located on two opposite sides of the fourth signal electrode 41. The fourth signal electrode 41 of the first adapter structure 4 is connected to the second signal electrode 201, so as to realize the electrical connection between the first adapter structure 4 and the first transmission structure 2*a*. Specifically, the spacing between the eighth ground electrode 42 and the ninth ground electrode 43 in the first adapter structure 4 is larger than that between the third ground electrode 202 and the fourth ground electrode 203 in the first transmission structure 2*a*. This is so arranged because the antenna mainly includes a feed structure 5 for feeding, and the feed structure 5 includes, but is not limited to, SMA (SubMiniature version A). By taking the SMA as an example, a distance between pins of the SMA needs to be adapted to a distance between the second signal electrode 201, the third ground electrode 202 and the fourth ground electrode 203 of the first transmission structure 2*a*. However, the distance between the second signal electrode 201, the third ground electrode 202 and the fourth ground electrode 203 is much smaller than the distance between the pins of the SMA and a size of a pin, which easily causes a short circuit. By enabling the first adapter structure 4 to adapt to the distance between the pins of the SMA, the connection between the SMA and the first transmission structure 2*a* is realized through the first adapter structure 4, and then the feeding of the antenna is realized.

Further, with continued reference to FIG. 8, in order to reduce the wiring, the third ground electrode 202 in the first transmission structure 2*a* and the eighth ground electrode 42 in the first adapter structure 4 may be a unitary structure (have a one-piece structure), the fourth ground electrode 203 in the first transmission structure 2*a* and the ninth ground electrode 43 in the first adapter structure 4 may be a unitary structure, and the second signal electrode 201 in the first transmission structure 2*a* and the fourth signal electrode 41 in the first adapter structure 4 may be a unitary structure. In this case, the third ground electrode 202 and the eighth ground electrode 42 may be made of the same material and disposed in the same layer. In this case, the third ground electrode 202 and the eighth ground electrode 42 may be formed by a single patterning process. Accordingly, the fourth ground electrode 203 and the ninth ground electrode 43 may be made of the same material and disposed in the same layer. In this case, the fourth ground electrode 203 and the ninth ground electrode 43 may be formed by a single patterning process; and the second signal electrode 201 and the fourth signal electrode 41 may be made of the same material and disposed in the same layer. In this case, the second signal electrode 201 and the fourth signal electrode 41 may be form by a single patterning process. Furthermore, the second signal electrode 201, the third ground electrode 202 and the fourth ground electrode 203 in the first transmission structure 2*a*, and the fourth signal electrode 41, the eighth ground electrode 42 and the ninth ground electrode 43 in the first adapter structure 4 may be disposed in the same layer and made of the same material. In this case, the second signal electrode 201, the third ground electrode 202 and the fourth ground electrode 203 in the first transmission structure 2*a*, and the fourth signal electrode 41, the eighth ground electrode 42 and the ninth ground electrode 43 in the first adapter structure 4 may be formed by a single patterning process, which cannot increase the overall thickness of the antenna and the process steps.

Figure 9:
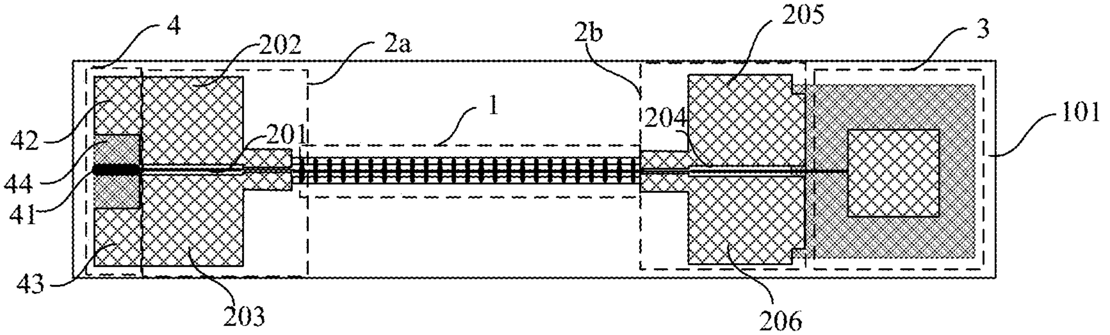
FIG. 9 is a schematic diagram of another structure of an antenna according to an embodiment of the present disclosure.

In some examples, FIG. 9 is a schematic diagram of another structure of an antenna according to an embodiment of the present disclosure; as shown in FIG. 9, the antenna has substantially the same structure as the antenna shown in FIG. 8, except that the first adapter structure 4 may be a GCPW transmission structure. For example: the first adapter structure 4 may include a fourth signal electrode 41, an eighth ground electrode 42, and a ninth ground electrode 43 disposed on the first surface of the dielectric substrate 101, and a tenth ground electrode 44 disposed on the second surface of the dielectric substrate 101. Extending directions of the fourth signal electrode 41, the eighth ground electrode 42 and the ninth ground electrode 43 are the same, and the eighth ground electrode 42 and the ninth ground electrode 43 are respectively located on two opposite sides of the fourth signal electrode 41. Orthographic projections of the fourth signal electrode 41, the eighth ground electrode 42 and the ninth ground electrode 43 on the dielectric substrate 101 all at least partially overlap with an orthographic projection of the tenth ground electrode 44 on the dielectric substrate 101. For example: the orthographic projections of the fourth signal electrode 41, the eighth ground electrode 42 and the ninth ground electrode 43 on the dielectric substrate 101 are covered by the orthographic projection of the tenth ground electrode 44 on the dielectric substrate 101. The fourth signal electrode 41 of the first adapter structure 4 is connected to the second signal electrode 201, so as to realize the electrical connection between the first adapter structure 4 and the first transmission structure 2*a*. Specifically, a spacing between the eighth ground electrode 42 and the ninth ground electrode 43 in the first adapter structure 4 is larger than that between the third ground electrode 202 and the fourth ground electrode 203 in the first transmission structure 2*a*. Similarly to the first adapter structure 4 of the antenna shown in FIG. 8, the spacing between the fourth signal electrode 41, the eighth ground electrode 42 and the ninth ground electrode 43 is also adapted to the spacing between the pins of the feed structure 5. The remaining structure of the antenna may be the same as that of the antenna shown in FIG. 8, and thus, the description thereof is not repeated.

Further, since all signals of the eighth ground electrode 42, the ninth ground electrode 43 and the tenth ground electrode 44 are ground signals, both the eighth ground electrode 42 and the ninth ground electrode 43 may be electrically connected to the tenth ground electrode 44, so that the ground signal is input through one signal input terminal, and thus, all voltages at the eighth ground electrode 42, the ninth ground electrode and the tenth ground electrode 44 are ground voltages. For example: the eighth ground electrode 42 and the ninth ground electrode 43 are electrically connected to the tenth ground electrode 44 through vias extending through the dielectric substrate 101, respectively.

Figure 10:
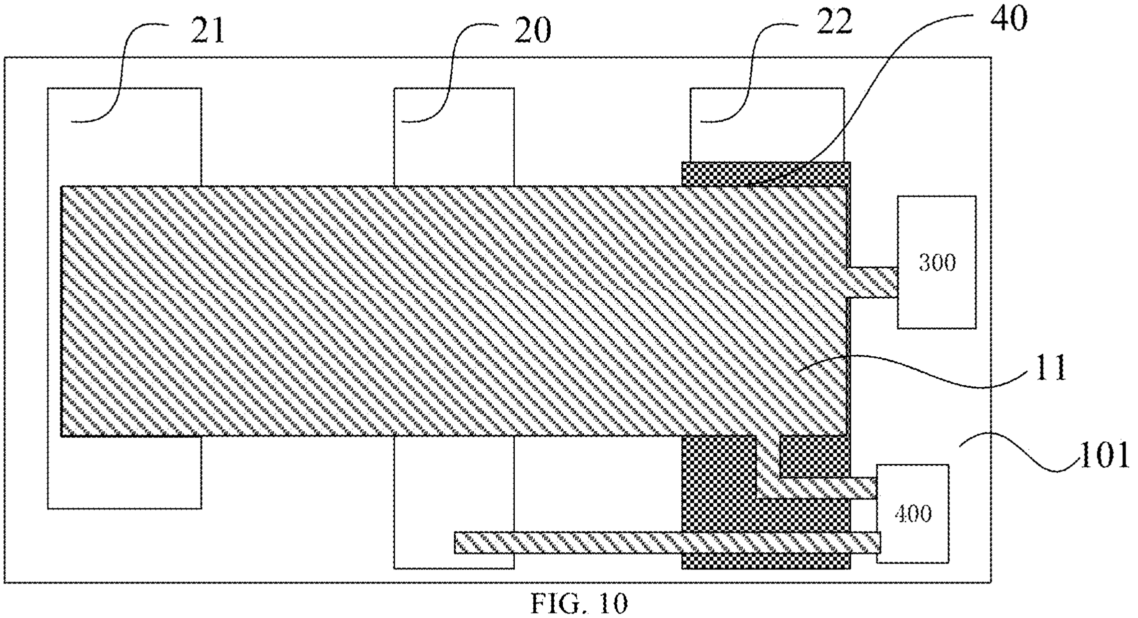
FIG. 10 is a schematic diagram of a structure of a phase control unit in an antenna according to an embodiment of the present disclosure.

In some examples, FIG. 10 is a schematic diagram of a structure of a phase control unit in an antenna according to an embodiment of the present disclosure; as shown in FIG. 10, to further improve the phase adjustment capability of the phase shifter 1, the phase shifter 1 further includes a first switch unit 300 disposed on the dielectric substrate 101, the first switch unit 300 is configured to provide a bias voltage signal to the membrane bridges 11 when receiving a first control signal. Because the phase shifter 1 provided by the embodiment of the present disclosure further includes the first switch unit 300 disposed on the dielectric substrate 101, the first switch unit 300 may perform individual potential control on the membrane bridges 11 (separately control potentials of the membrane bridges 11) of the phase shifter 1 where the first switch unit is located under the control of the first control signal, so that when a plurality of phase shifters 1 provided by the embodiment of the present disclosure are used as a plurality of phase shifting units to form a complex control circuit (such as an array antenna), the first control signals may be transmitted to the first switch units 300 to independently regulate and control the operating states of different phase shifting units, and precisely regulate and control the phase shifting degree, thereby realizing a control of units and devices in a circuit level.

A circuit structure of the first switch unit 300 is not particularly limited in the embodiment of the present disclosure. For example, as an example of the embodiment of the present disclosure, the first switch unit 300 has a bias voltage input terminal, a first output terminal, and a first control terminal. The bias voltage input terminal is configured to receive a direct current bias voltage signal, the first output terminal is electrically connected to the membrane bridges 11 through the direct current bias lines 30, and the first switch unit 300 may conduct the first output terminal and the bias voltage input terminal when the first control terminal receives a first control signal. To simplify the process, preferably, the direct current bias lines 30 and the membrane bridges 11 are provided in the same layer, that is, formed in the same patterning process.

Specifically, the circuit structure of the first switch unit 300 may be implemented by a thin film transistor (TFT). For example, the first switch unit 300 includes a first switch transistor, a first electrode of the first switch transistor is formed as the direct current bias voltage input terminal of the first switch unit 300, a second electrode of the first switch transistor is formed as the first output terminal of the first switch unit 300 (i.e., the second electrode of the first switch transistor is electrically connected to the membrane bridges 11 through the direct current bias lines 30), a control electrode of the first switch transistor is formed as the first control terminal of the first switch unit 300, and the first switch transistor may conduct the first electrode and the second electrode when the control electrode receives a first control signal.

It is further found by the inventor in the research that a hysteresis effect is often caused by residual charges in frequent charging and discharging processes of the conventional phase shifter 1, causing the problems that initial capacitance values of the phase shifting units are different in the operating process so that the precision is reduced.

In order to solve the above problems and improve the control accuracy of the phase shifter 1, as a preferred embodiment of the present disclosure, as shown in FIG. 10, the phase shifter 1 further includes a second switch unit 400 provided on the dielectric substrate 101, and the second switch unit 400 is configured to electrically connect signal lines to the membrane bridges 11 upon receiving a second control signal. Specifically, as shown in FIG. 10, the second switch unit 400 may be electrically connected to the signal lines through a connection line, and electrically connected to the membrane bridges 11 through direct current bias lines 30.

In the phase shifter 1 provided in the embodiment of the present disclosure, the second switch unit may electrically connect the signal lines to the membrane bridges 11 when receiving the second control signal, so as to form a residual charge discharging loop between the signal lines and the membrane bridges 11, which solves a hysteresis effect caused by residual charges in the frequent charging and discharging processes of the phase shifting units, improves the consistency of the initial capacitance values of the phase shifting units in an operating process, and further improves the control accuracy of the phase shifter 1 on a phase of a radio frequency signal.

In order to improve process compatibility of the phase shifter 1, as another preferred embodiment of the present disclosure, as shown in FIG. 10, the first switch unit 300 may alternatively be directly used to electrically connect the signal line with the membrane bridges 11 upon receiving the second control signal.

Specifically, the circuit structure of the first switch unit 300 may be a MEMS single-pole double-throw switch, by which operating loops are selected and operating states are switched, that is, an external driving loop or the residual charge discharging loop is selected.

In some examples, the dielectric substrate 101 includes, but is not limited to, a glass substrate, a sapphire substrate, a polyethylene terephthalate substrate, a triallyl cyanurate substrate, a transparent flexible polyimide substrate, a foam substrate, a printed circuit board (PCB), or the like. Alternatively, the material of the dielectric substrate 101 is not limited to the above materials. In actual products, the dielectric substrate 101 of different material may be selected according to the requirement of a dielectric constant of the dielectric substrate 101.

In some examples, a material of the radiation patch 31 in the antenna unit 3 may be a plurality of materials. For example, the material of the radiation patch 31 may include at least one of copper, aluminum, gold, and silver. Similarly, materials of the first signal electrode 20, the first ground electrode 21, and the second ground electrode 22 in the phase shifter 1, and the second signal electrode 201, the third ground electrode 202, and the fourth ground electrode 203 in the first transmission structure, and the third signal electrode 204, the fifth ground electrode 205, and the sixth ground electrode 206 in the second transmission structure **2*b*** may also be a plurality of materials. For example, the materials of these structures may each include at least one of copper, aluminum, gold, and silver.

Correspondingly, an embodiment of the present disclosure further provides a method for manufacturing the antenna, including:

S1, providing a dielectric substrate 101.

S2, forming a first transmission structure **2*a*, a second transmission structure 2*b*, a phase control unit 100, and a radiation patch 31 of an antenna unit 3 on a first surface of the dielectric substrate 101**.

The step of forming the phase control unit 100 includes: forming a first signal electrode 20, a first ground electrode 21 and a second ground electrode 22 on a first surface of the dielectric substrate 101; forming an interlayer insulating layer 40 on one side of the first signal electrode 20, the first ground electrode 21, and the second ground electrode 22; and forming membrane bridges 11 on a side of the interlayer insulating layer 40 away from the dielectric substrate 101.

In some examples, the step of forming the membrane bridges 11 includes: forming a sacrificial layer on a side of the first signal electrode 20 away from the dielectric substrate 101, forming the membrane bridges 11 on a side of the sacrificial layer away from the dielectric substrate 101, and then removing the sacrificial layer, thereby forming the membrane bridges 11 in the phase shifter 1.

In some examples, the first transmission structure **2*a* includes a second signal electrode 201, a third ground electrode 202, and a fourth ground electrode 203; the second transmission structure 2*b* includes a third signal electrode 204, a fifth ground electrode 205, and a sixth ground electrode 206. In the step S2, a pattern including the first signal electrode 20, the first ground electrode 21, the second ground electrode 22, the second signal electrode 201, the third ground electrode 202, the fourth ground electrode 203, the third signal electrode 204, the fifth ground electrode 205, and the sixth ground electrode 206** may be formed through a single patterning process.

S3, forming a pattern of a seventh ground electrode 32 of the antenna unit 3 on a second surface of the dielectric substrate 101.

The preparation of the antenna in the embodiment of the present disclosure is completed. It should be noted that the steps S2 and S3 may be interchanged, and are not repeated herein.

Figure 11:
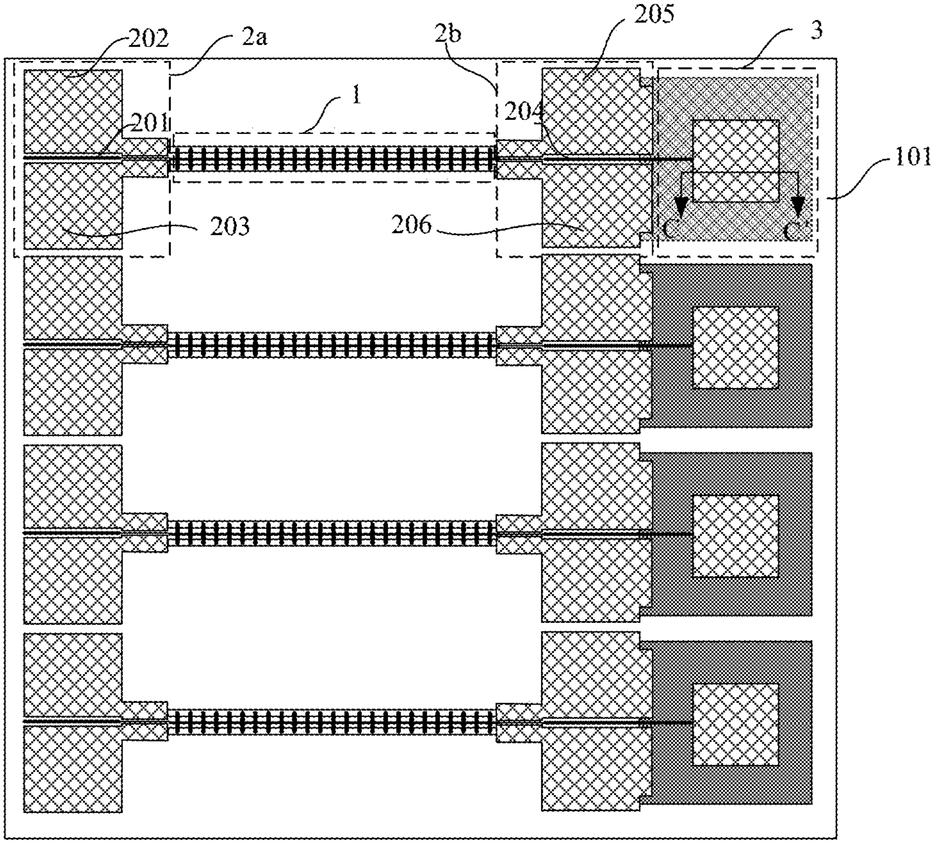
FIG. 11 is a schematic diagram of a structure of an antenna array according to an embodiment of the present disclosure.
Figure 12:
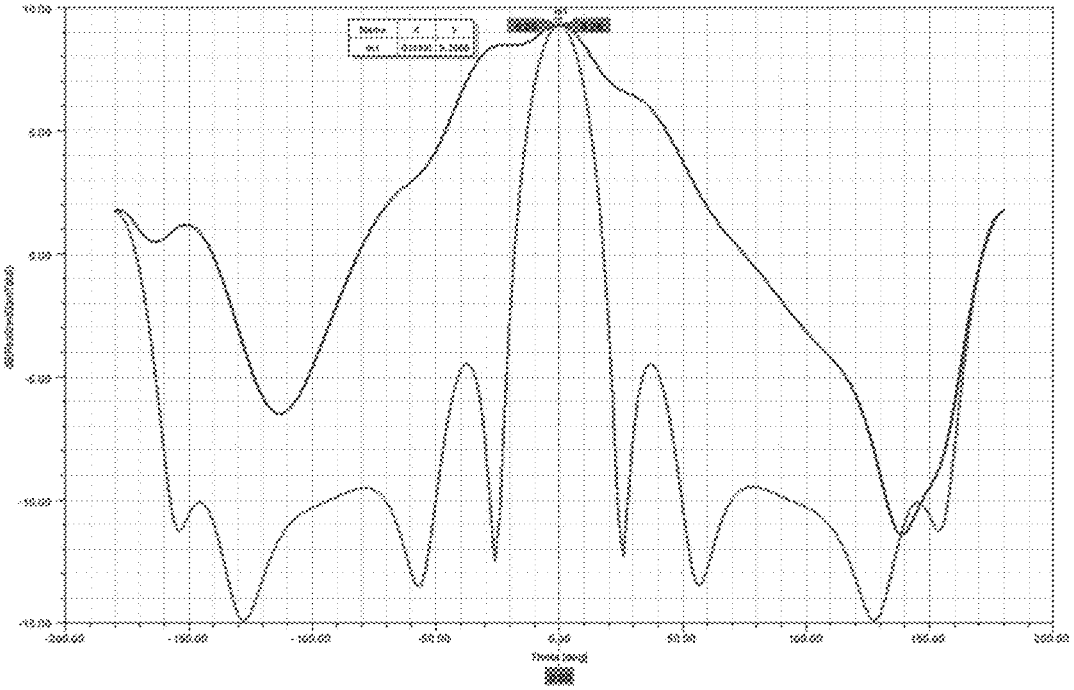
FIGS. 12 to 17 are schematic diagrams each showing a simulation for a structure of an antenna array according to an embodiment of the present disclosure.
Figure 13:
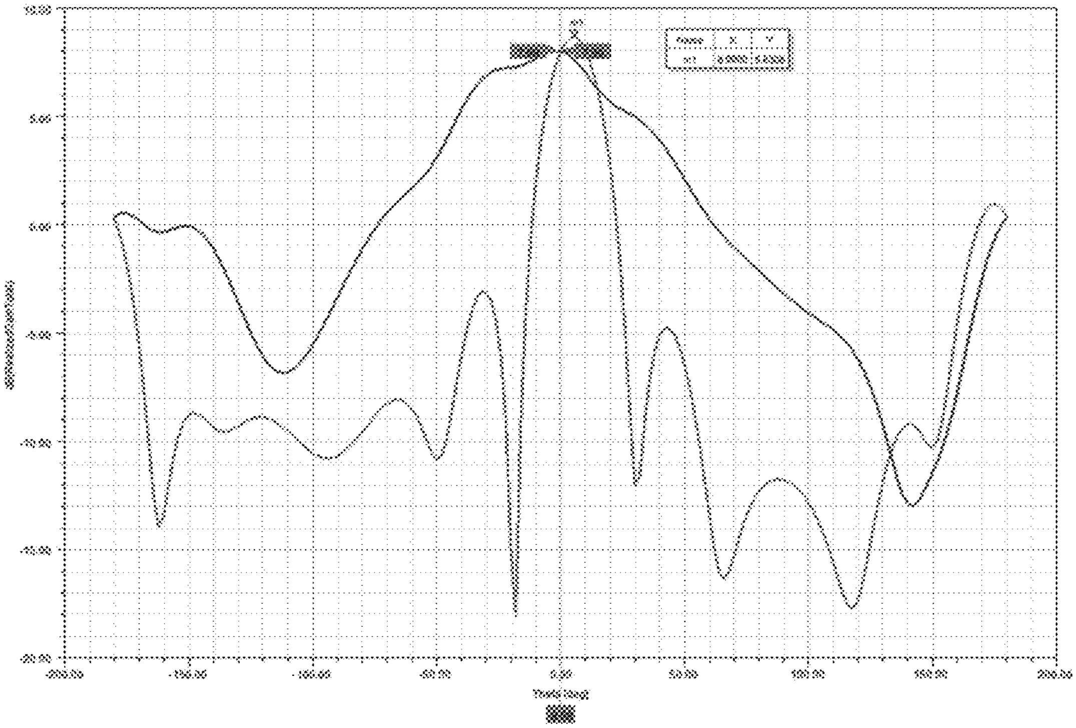
Figure 14:
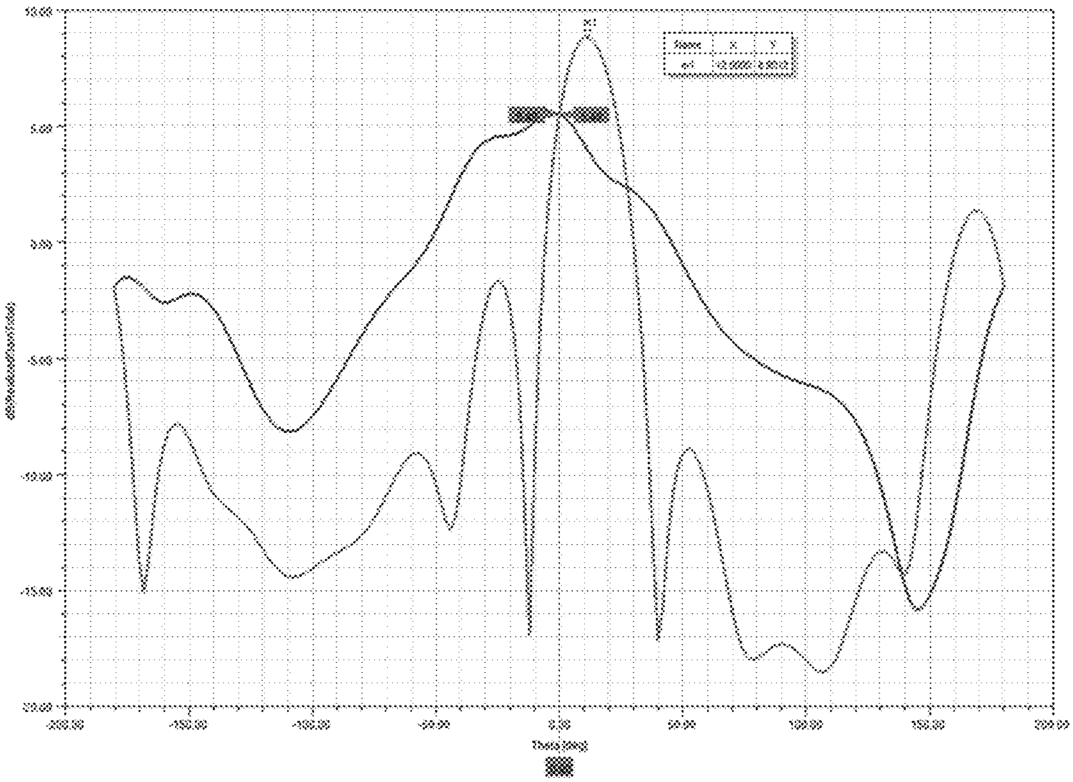
Figure 15:
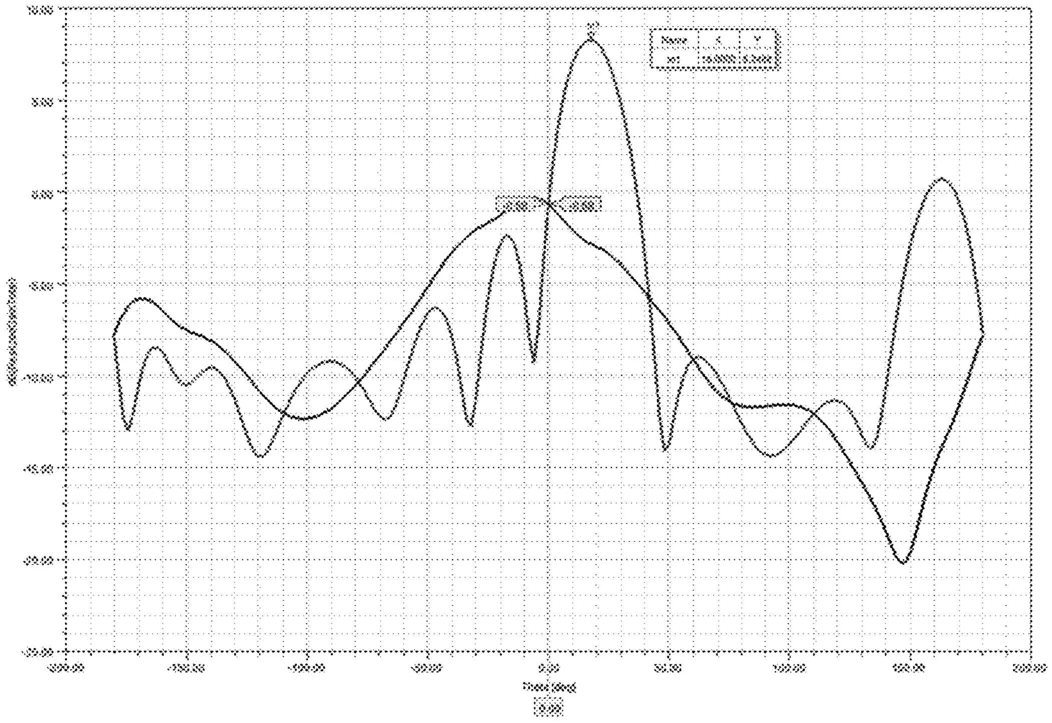
Figure 16:
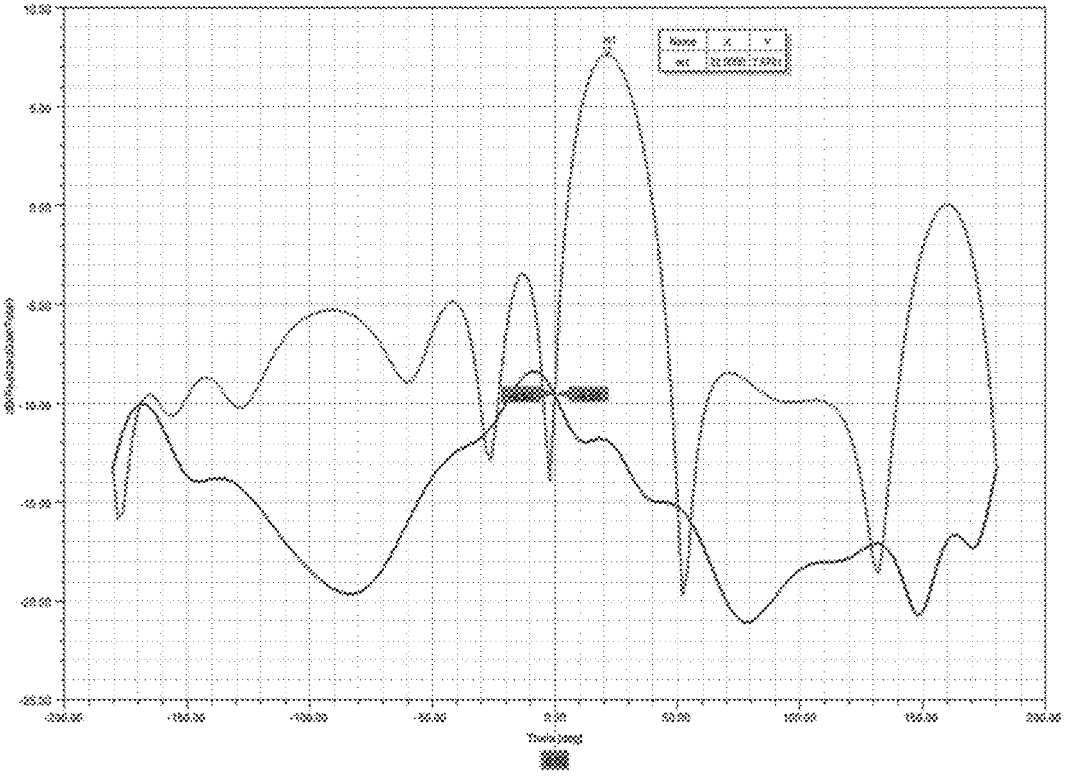
Figure 17:
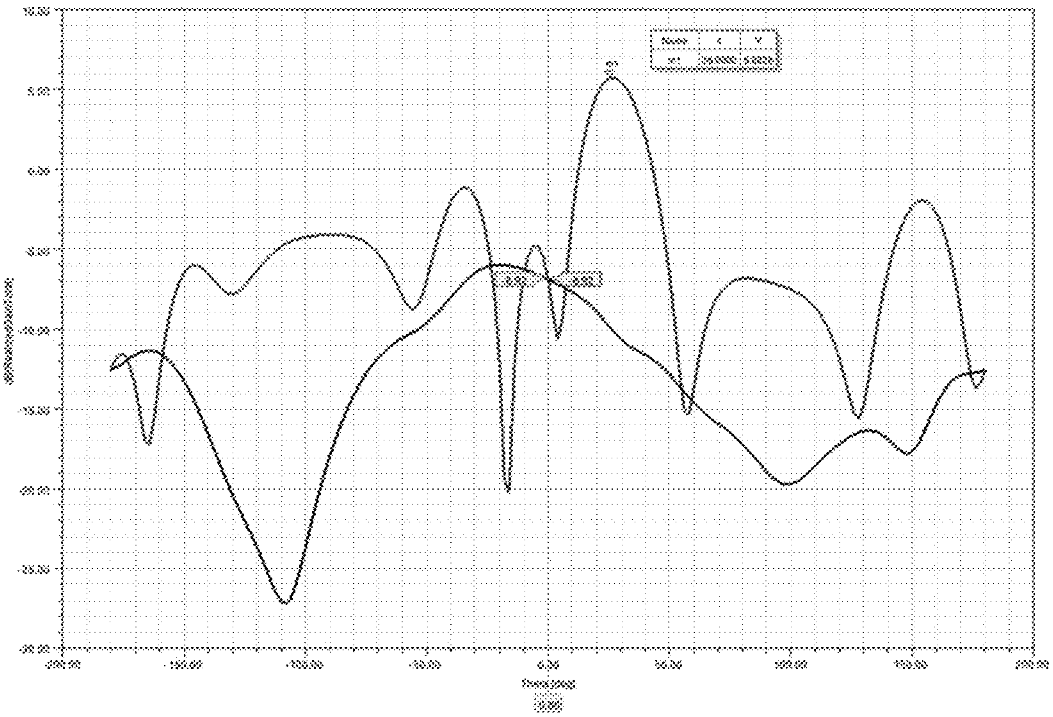

In a second aspect, FIG. 11 is a schematic diagram of a structure of an antenna array according to an embodiment of the present disclosure. As shown in FIG. 11, the antenna array includes at least one antenna module A, each antenna module A includes a plurality of antennas arranged side by side, and each antenna may adopt the antenna of any one of the above embodiments.

In some examples, FIG. 11 schematically illustrates four antennas. That is, the antennas constitute a 1×4 antenna array. The phase shifter 1 in the antenna may be the phase shifter 1 shown in FIG. 1, that is, a 4-bit digital phase shifter 1 composed of 16 MEMS membrane bridges 11. The membrane bridges 11 in the phase shifter 1 may be distributed according to 1/1/2/4/8, that is, one membrane bridge/one membrane bridge/two membrane bridges/four membrane bridges/eight membrane bridges are connected, respectively. For example: a distance between adjacent antenna units 3 is 0.59λ, and according to a theoretical formula $\theta=\sin^{-1}\Phi\lambda/2\pi d$, where θ represents a scanning angle of the antenna array, Φ represents a phase difference between two adjacent antennas, λ represents a wavelength of an electromagnetic wave (a microwave signal), and d represents the distance between the adjacent antenna units 3. It may be known that when Φ is 0°/22.5°/45°/67.5°/90°/112.5°, respectively, the scanning angles of 0°/6°/12°/19°/25°/32° of the antenna array may be theoretically realized. The phase differences of 0°/22.5°/45°/67.5°/90°/112.5° may be achieved by controlling the number of the pulled down membrane bridges 11 in the four antennas, respectively. For example: for the setting of the pulled down membrane bridges 11, 0/0/0/0, 0/1/2/3, 0/2/4/6, 0/3/6/9, 0/4/8/12, 0/5/10/15, the number indicates the number of the pulled down membrane bridges 11 for each phase control unit 100 in each antenna. The simulation result is shown in FIGS. 12 to 17. As can be seen from FIG. 12, when the number of the pulled down membrane bridges 11 is set to 0/0/0/0, that is, when the phase difference Φ is 0°, the maximum gain of the antenna array is 9.29 dB and occurs at Theta=0°, and thus the corresponding antenna scanning angle is 0°. As can be seen from FIG. 13, when the number of the pulled down membrane bridges 11 is set to 0/1/2/3, that is, when the phase difference Φ is 22.5°, the maximum gain of the antenna array is 8.63 dB and occurs at Theta=6°, and thus the corresponding antenna scanning angle is 6°. As can be seen from FIG. 14, when the number of the pulled down membrane bridges 11 is set to 0/2/4/6, that is, when the phase difference Φ is 45°, the maximum gain of the antenna array is 8.80 dB and occurs at Theta=12°, and thus the corresponding antenna scanning angle is 12°. As can be seen from FIG. 15, when the number of the pulled down membrane bridges 11 is set to 0/3/6/9, that is, when the phase difference Φ is 67.5°, the maximum gain of the antenna array is 8.25 dB and occurs at Theta=18°, and thus the corresponding antenna scanning angle is 18°. As can be seen from FIG. 16, when the number of the pulled down membrane bridges 11 is set to 0/4/8/12, that is, when the phase difference Φ is 90°, the maximum gain of the antenna array is 7.58 dB and occurs at Theta=22°, and thus the corresponding antenna scanning angle is 22°. As can be seen from FIG. 17, when the number of the pulled down membrane bridges 11 is set to 0/5/10/15, that is, when the phase difference Φ is 112.5°, the maximum gain of the antenna array is 5.68 dB and occurs at Theta=26°, and thus the corresponding antenna scanning angle is 26°. Therefore, the maximum gain value of the antenna is changed in a range of 5.68 dB to 9.29 dB.

In some examples, the antenna array includes not only the above structure, but also the feed structure 5. The feed structure 5 may be connected to the antenna through the SAM; the feed structure 5 may alternatively be integrated on the dielectric substrate 101 and connected to the antenna; and may alternatively be integrated on a PCB and then connected to the antenna through bonding. The feed structure 5 includes, but is not limited to, a power divider. In the following description, by taking an example that the antenna array includes 1×4 antennas and a corresponding power divider adopts a one-to-four power divider, the antenna arrays having different feed structures 5 are described. In the following description, as an example, the antenna array only includes one antenna module A, that is, the antenna array is a one-dimensional antenna array.

Figure 18:
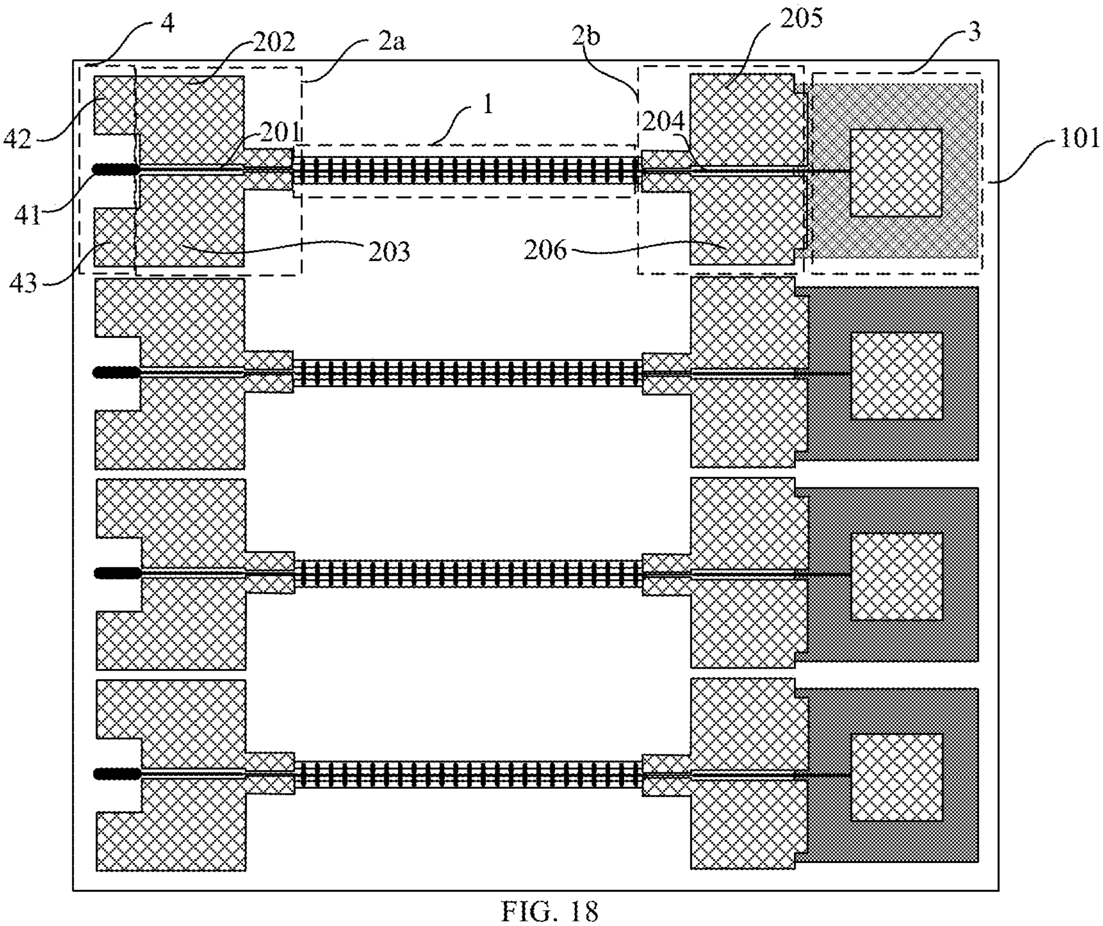
FIG. 18 is a schematic diagram of another antenna array according to an embodiment of the present disclosure.
Figure 19:
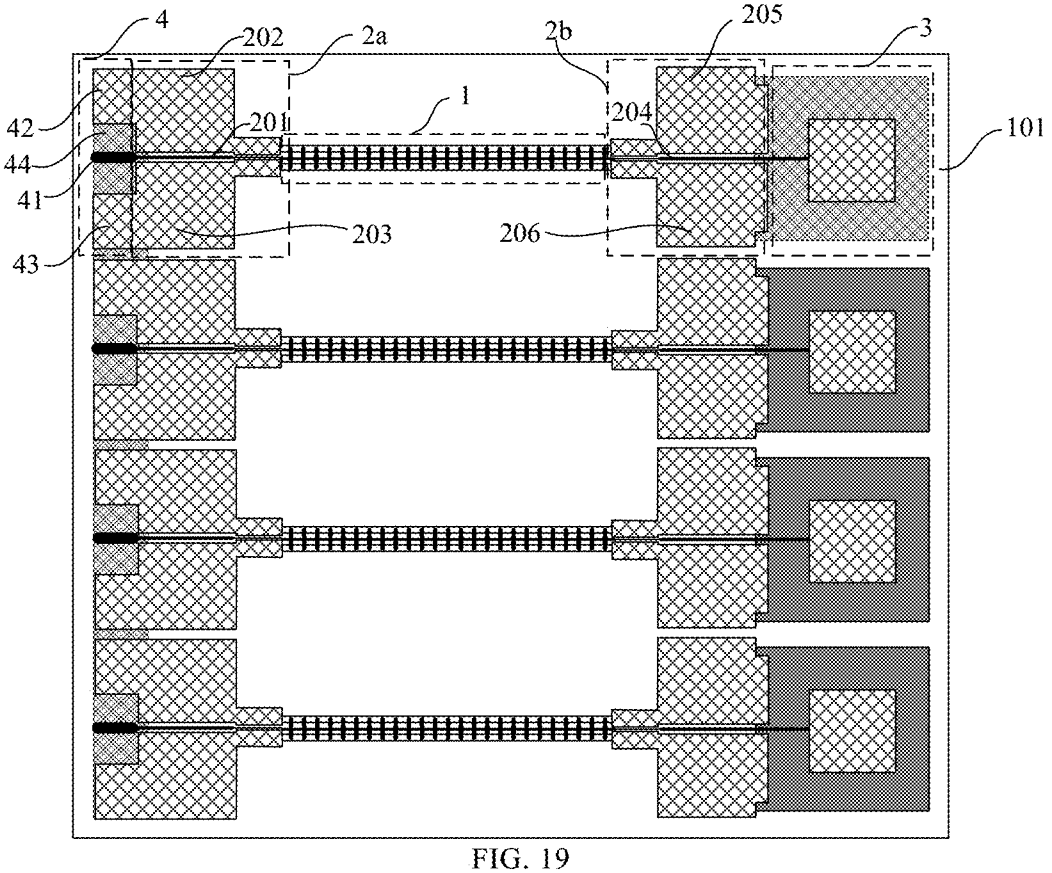
FIG. 19 is a schematic diagram of another antenna array according to an embodiment of the present disclosure.

In a first example, FIG. 18 is a schematic diagram of another antenna array according to an embodiment of the present disclosure. FIG. 19 is a schematic diagram of another antenna array according to an embodiment of the present disclosure. As shown in FIGS. 18 and 19, each antenna in the 1×4 antenna array employs the antenna shown in FIG. 8 or 9. In this case, the fourth signal electrode 41 in the first adapter structure 4 of each antenna is electrically connected to one SMA, and four output terminals of the one-to-four power divider are electrically connected to the SMA through cables, to provide a power to the antenna array through the one-to-four power divider. When the 1×4 antenna array including the antenna shown in FIG. 8 is adopted, that is, when the first adapter structure 4 is a CPW adapter structure, through HFSS (High Frequency Structure Simulator) simulation, when Φ=0°, the gain of the antenna is 9.36 dB, and the 3 dB beam width is 22°/18°. When the 1×4 antenna array including the antenna shown in FIG. 9 is adopted, that is, when the first adapter structure 4 is a GCPW adapter structure, through the HFSS simulation, when Φ=0°, the gain of the antenna is 9.04 dB, and the 3 dB beam width is 21°/22°.

Figure 20:
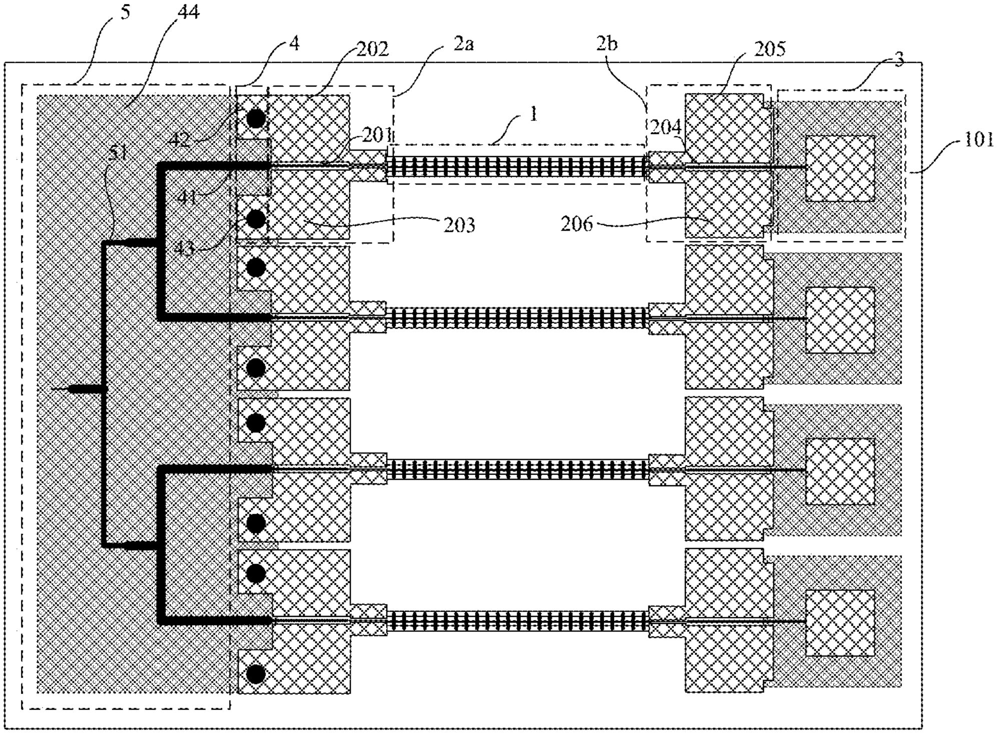
FIG. 20 is a schematic diagram of an antenna array according to an embodiment of the present disclosure.

In a second example, FIG. 20 is a schematic diagram of an antenna array according to an embodiment of the present disclosure. As shown in FIG. 20, the feed structure 5 in the antenna array is integrated on the dielectric substrate 101 and includes a feed network located on the first surface of the dielectric substrate 101 and an eleventh ground electrode 52 located on the second surface of the dielectric substrate 101. In some examples, the eleventh ground electrode 52 and the tenth ground electrode 44 located in the first adapter structure 4 may be a unitary structure. In the embodiment of the present disclosure, as an example, the eleventh ground electrode 52 and the tenth ground electrode 44 are a unitary structure for description. In some examples, the antenna module A includes $2^n$ antennas, and the feed network includes n-stage transmission lines 51. A transmission line 51 at the 1st stage is connected to the fourth signal electrodes 41 in two adjacent antennas, and the fourth signal electrodes 41 connected to different transmission lines 51 at the 1st stage are different; one transmission line 51 at the mth stage is connected to two adjacent transmission lines 51 at the (m−1)th stage, and the transmission lines 51 at the (m−1)th stage connected to different transmission lines 51 at the mth stage are different; where n≥2, 2≤m≤n, and both m and n are integers. As shown in FIG. 20, as an example, the antenna array includes 4 antennas, that is, n=2. Two ends of the 1st transmission line 51 at the 1st stage are connected to the fourth signal electrodes 41 in the first and second antennas from top to bottom, and two ends of the 2nd transmission line 51 at the 1st stage are connected to the fourth signal electrodes 41 in the third and fourth antennas from top to bottom. Both ends of the transmission line 51 at the 2nd stage are connected to the two transmission lines 51 at the 1st stage. Alternatively, the transmission line 51 at the 2nd stage is also connected to a signal introducing terminal, to introduce microwave signals into the antenna array. Through the HFSS simulation, when Φ=0°, the gain of the antenna is 7.30 dB and the 3 dB beam width is 24°/21°.

In a third example, the antenna array is substantially the same as the second example, except that the feed structure 5 in the antenna array is integrated on a PCB, that is, a feed network is formed on the PCB. At this time, the PCB and the antenna array may be bonded and connected together, to realize the electrical connection between the feed structure 5 and the antenna. Specifically, first connection pads are formed on the first surface of the dielectric substrate 101 and are in a one-to-one correspondence with the fourth signal electrodes 41, second connection pads are formed on the PCB and are in a one-to-one correspondence with the two ends of the nth stage transmission lines 51 of the feed network, and the first connection pads and the second connection pads are bonded and connected together in a one-to-one correspondence, so that the bonding connection between the plurality of antennas and the feed structure 5 is realized.

It should be noted that in the foregoing description, the antenna array is described by taking an example in which the antenna array includes the phase shifter 1 each including 16 phase control units 100. However, when the antenna array includes the phase shifter 1 each including 32 phase control units 100, the antenna array can achieve a larger scanning angle. It can be seen through a calculation that the maximum theoretical scanning angle is about 58°.

Figure 21:
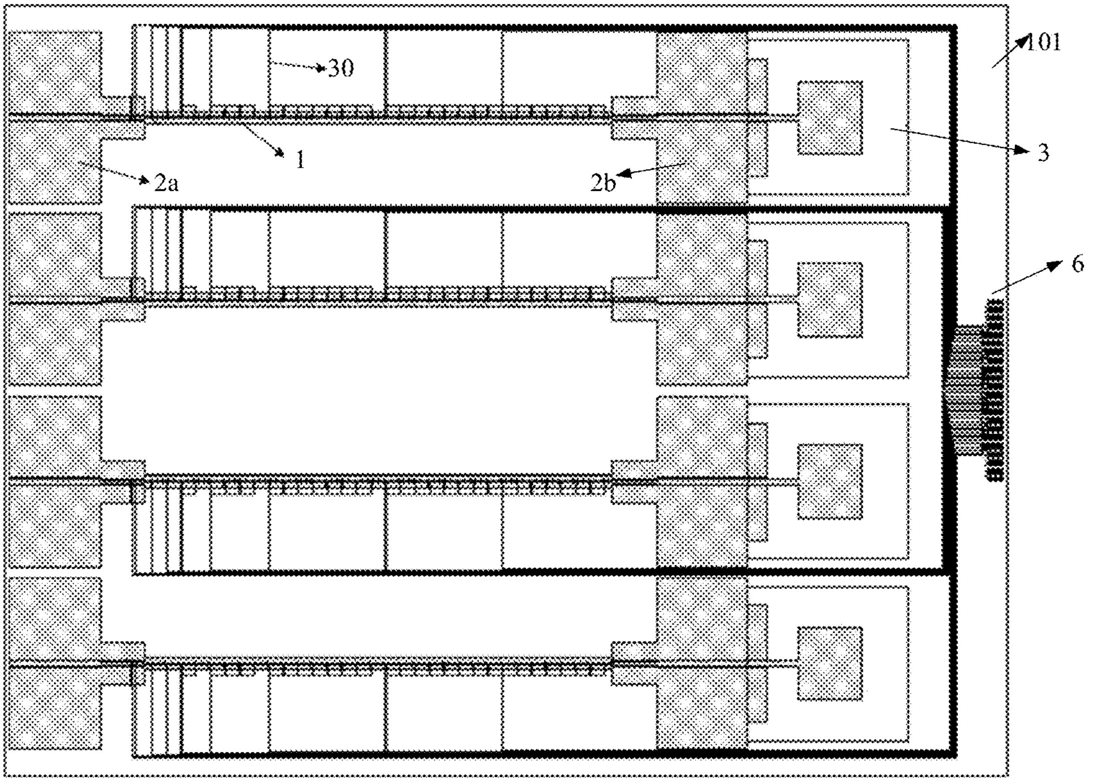
FIG. 21 is a schematic diagram showing a wiring of an antenna array according to an embodiment of the present disclosure.

In some examples, FIG. 21 is a schematic diagram showing a wiring of an antenna array according to an embodiment of the present disclosure. As shown in FIG. 21, in the antenna array, the phase shifter 1 of each antenna includes 32 MEMS membrane bridges 11. Alternatively, this antenna does not limit the scope of the embodiments of the present disclosure. The phase shifter 1 of each antenna includes 32 MEMS membrane bridges 11, which is for easy understanding. For each antenna, a signal electrode in the first transmission structure 2*a* is connected to two direct current bias signal lines, one direct current bias line 30 is led out from each membrane bridge 11 in the phase shifter 1, and then, from left to right, the 3rd to 4th membrane bridges 11 are connected together and combined into one path as a group, the 5th to 8th membrane bridges 11 are connected together and combined into one path as a group, the 9th to 16th membrane bridges 11 are connected together and combined into one path as a group and the 17th to 32th membrane bridges 11 are connected together and combined into one path as a group, wherein an additional direct current bias line 30 is led out from the 17th to 32th membrane bridges 11 compared to each of other groups of the membrane bridges 11. Each antenna corresponds to 9 direct current bias lines 30, and the 1×4 antenna array includes a total of 36 direct current bias lines, which are symmetrically distributed, pass through the space among the adjacent antenna units 3 and are converged on the right side of the whole antenna array, and are led to an FPC bonding region 6. The FPC is bonded and connected to the direct current bias lines 30 in the 1×4 antenna array, and then the FPC is inserted into a corresponding interface of the circuit board, so that a direct current voltage in each path may be controlled through the circuit board in a programming mode, and the scanning function of the antenna array is realized.

Figure 22:
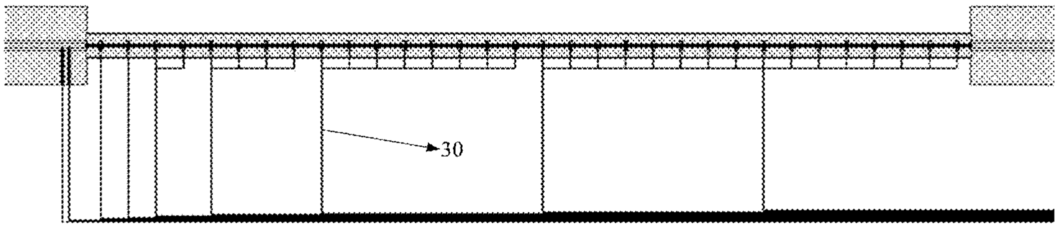
FIG. 22 is a schematic diagram of a MEMS membrane bridge connected to a direct current bias line in FIG. 21.
Figure 23:
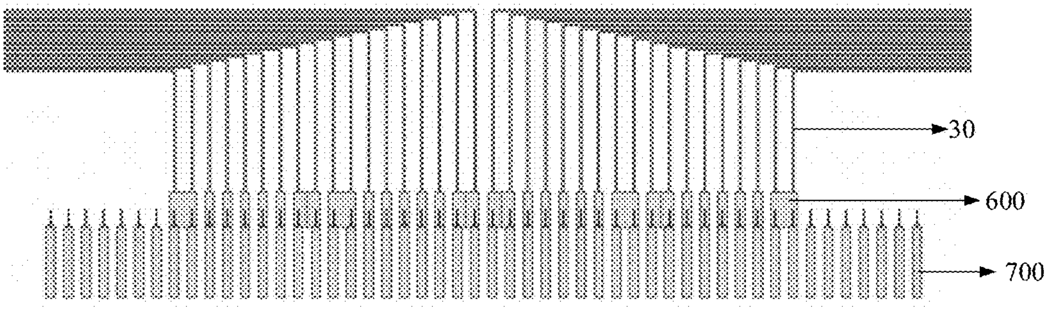
FIG. 23 is a schematic diagram of an FPC (Flexible Printed Circuit) bonding region in FIG. 21.

FIG. 22 is a schematic diagram of a MEMS membrane bridge connected to a direct current bias line in FIG. 21. FIG. 23 is a schematic diagram of an FPC bonding region in FIG. 21. As shown in FIG. 22, the direct current bias lines 30 connected to the membrane bridges are located on the same side of the first signal electrode 20, as shown in FIG. 23, the direct current bias lines 30 extend to the FPC bonding region 6 and are connected to the first connection pads 600 in the FPC bonding region 6 in a one-to-one correspondence, and the first connection pads 600 are bonded and connected to the second connection pads 700 in the FPC in a one-to-one correspondence, so as to realize the feeding of microwave signals.

Figure 24:
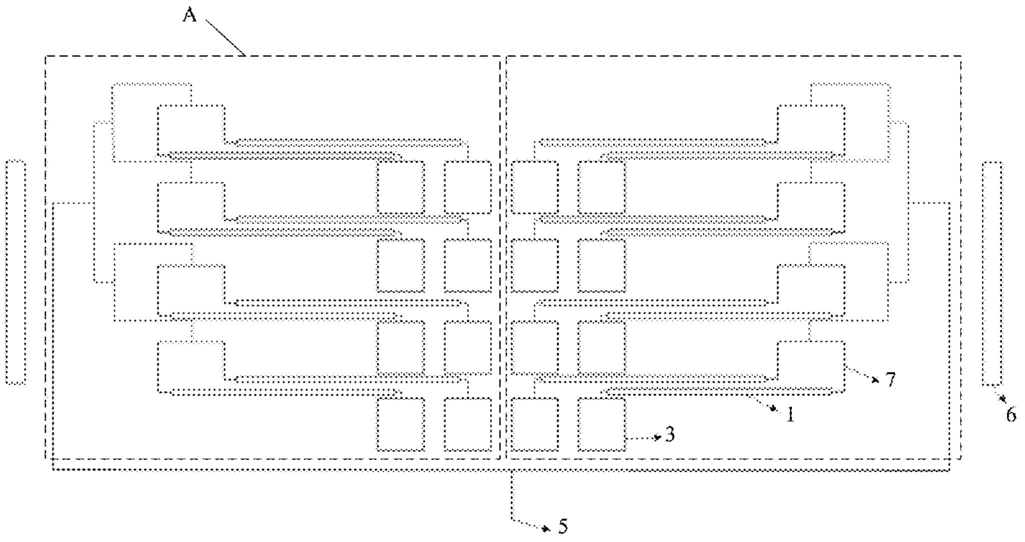
FIG. 24 is a schematic diagram of another antenna array according to an embodiment of the present disclosure.

The antenna array provided above is a one-dimensional antenna array. FIG. 24 is a schematic diagram of another antenna array according to an embodiment of the present disclosure. As shown in FIG. 24, the embodiment of the present disclosure further provides a two-dimensional antenna array, including two one-dimensional antenna arrays, that is, the antenna array includes two antenna modules A, and the two antenna modules A are arranged in mirror symmetry, and regions are adjacent to each other where the antenna units 3 of the two antenna modules A are located.

For example: the antenna array is a two-dimensional antenna array and mainly includes antenna units 3, phase shifters 1, power division wires and an FPC bonding region 6. For simplicity, the first transmission structure 2*a* and the second transmission structure 2*b* are not shown, only the location of the FPC bonding region is shown. Radio frequency signals are input from one port of the feed network; excitation radiation signals are fed to the antenna units 3 through a three-stage power divider; direct current signals flow through the direct current bias lines 30 through the FPC and to the MEMS phase shifters 1; the circuit board controls the pull-down of the MEMS membrane bridges 11 in each phase shifter 1, to realize different phase shift amounts, and thus realize the two-dimensional scanning of the antenna.

Figure 25:
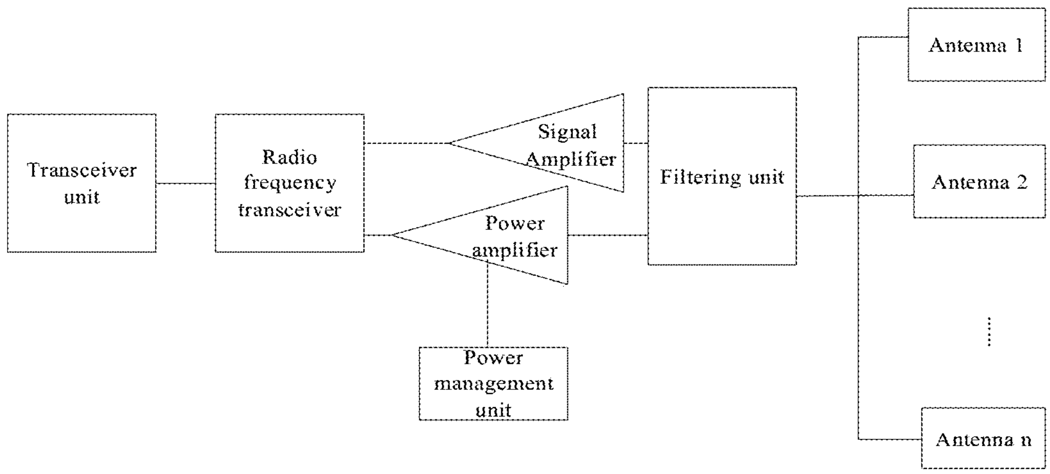
FIG. 25 is a schematic diagram of a structure of a communication system according to an embodiment of the present disclosure.

In a third aspect, FIG. 25 is a schematic diagram of a structure of a communication system according to an embodiment of the present disclosure. As shown in FIG. 25, an embodiment of the present disclosure provides a communication system, including at least one antenna array as described above.

In some examples, the communication system provided by embodiments of the present disclosure further includes a transceiver unit, a radio frequency transceiver, a signal amplifier, a power amplifier, and a filtering unit. The antenna in the communication system may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by an antenna in a communication system and is processed by the filtering unit, the power amplifier, the signal amplifier, and the radio frequency transceiver, the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the communication system, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the communication system, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the communication system provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An antenna, comprising:

a phase shifter, comprising: a dielectric substrate, a first signal electrode, a first reference electrode, a second reference electrode, an interlayer insulating layer, at least one phase control unit; wherein the dielectric substrate comprises a first surface and a second surface opposite to each other along a thickness direction of the dielectric substrate; extending directions of the first signal electrode, the first reference electrode, and the second reference electrode are the same; and the first signal electrode, the first reference electrode, and the second reference electrode are all on the first surface of the dielectric substrate, the first reference electrode and the second reference electrode are respectively on both sides of the first signal electrode; the interlayer insulating layer is on a side of the first signal electrode, the first reference electrode and the second reference electrode away from the dielectric substrate; each of the at least one phase control unit comprises at least one membrane bridge on a side of the interlayer insulating layer away from the dielectric substrate; the first signal electrode is at least partially in a space surrounded by the at least one membrane bridge and the dielectric substrate, and two ends of each of the at least one membrane bridge overlap with orthographic projections of the first reference electrode and the second reference electrode on the dielectric substrate, respectively;

a first transmission structure and a second transmission structure; wherein the first transmission structure is electrically connected to one end of the first signal electrode, and the second transmission structure is electrically connected to the other end of the first signal electrode; and an antenna unit electrically connected to the second transmission structure; and wherein the first transmission structure comprises: a second signal electrode, a third reference electrode, and a fourth reference electrode on the first surface of the dielectric substrate and having a same extending direction, the third reference electrode and the fourth reference electrode are respectively on two sides of the second signal electrode; and the second signal electrode is electrically connected to the first signal electrode; and the second transmission structure comprises: a third signal electrode, a fifth reference electrode and a sixth reference electrode on the first surface of the dielectric substrate and having a same extending direction, the fifth reference electrode and the sixth reference electrode are respectively on two sides of the third signal electrode; and the third signal electrode is electrically connected to the first signal electrode.

2. The antenna of claim 1, wherein the antenna unit comprises a radiation patch on the first surface of the dielectric substrate, and a seventh reference electrode on the second surface of the dielectric substrate; orthographic projections of the radiation patch and the seventh reference electrode on the dielectric substrate at least partially overlap with each other; and the third signal electrode is electrically connected to the radiation patch.

3. The antenna of claim 2, wherein the fifth reference electrode comprises a first main body portion and a first protrusion portion connected to a side of the first main body portion close to the radiation patch; the sixth ground electrode comprises a second main body portion and a second protrusion portion connected to a side of the second main body portion close to the radiation patch; and orthographic projections of the first protrusion portion and the second protrusion portion on the dielectric substrate at least partially overlap with an orthographic projection of the seventh ground electrode on the dielectric substrate.

4. The antenna of claim 3, wherein the first main body portion and the first protrusion portion are of a unitary structure; and the second main body portion and the second protrusion portion are of a unitary structure.

5. The antenna of claim 1, further comprising at least one direct current bias line; wherein the at least one membrane bridge in each of the at least one phase control unit is connected to one corresponding direct current bias line.

6. The antenna of claim 1, wherein the at least one phase control unit comprises a plurality of phase control units, and at least some of the plurality of phase control units have different numbers of membrane bridges.

7. An antenna array, comprising at least one antenna module, each of which comprises the antenna of claim 1.

8. The antenna array of claim 7, wherein each of the at least one antenna module further comprises a feed structure electrically connected to the antenna.

9. The antenna array of claim 8, wherein the feed structure comprises a feed network on the first surface of the dielectric substrate and an eleventh ground electrode on the second surface of the dielectric substrate; an orthographic projection of the feed network on the dielectric substrate overlaps with an orthographic projection of the eleventh ground electrode on the dielectric substrate; and each antenna module comprises $2^n$ antennas, the feed network comprises n-stage transmission lines; a transmission line at a $1^{st}$ stage is connected to two adjacent antennas, and different transmission lines at the $1^{st}$ stage are connected to different antennas; one transmission line at an $m^{th}$ stage is connected to two adjacent transmission lines at an $(m-1)^{th}$ stage, and different transmission lines at the $(m-1)^{th}$ stage are connected to different transmission lines at the $m^{th}$ stage; where $n \geq 2$, $2 \leq m \leq n$, and both m and n are integers.

10. The antenna array of claim 7, wherein the antenna array comprises two antenna modules arranged in a mirror symmetry; and regions where the antenna units in the two antenna modules are located are adjacent to each other.

11. A communication system, comprising the antenna array of claim 7.

12. An antenna, comprising:

a phase shifter, comprising: a dielectric substrate, a first signal electrode, a first reference electrode, a second reference electrode, an interlayer insulating layer, at least one phase control unit; wherein the dielectric substrate comprises a first surface and a second surface opposite to each other along a thickness direction of the dielectric substrate; extending directions of the first signal electrode, the first reference electrode, and the second reference electrode are the same; and the first signal electrode, the first reference electrode, and the second reference electrode are all on the first surface of the dielectric substrate, the first reference electrode and the second reference electrode are respectively on both sides of the first signal electrode; the interlayer insulating layer is on a side of the first signal electrode, the first reference electrode and the second reference electrode away from the dielectric substrate; each of the at least one phase control unit comprises at least one membrane bridge on a side of the interlayer insulating layer away from the dielectric substrate; the first signal electrode is at least partially in a space surrounded by the at least one membrane bridge and the dielectric substrate, and two ends of each of the at least one membrane bridge overlap with orthographic projections of the first reference electrode and the second reference electrode on the dielectric substrate, respectively;

a first transmission structure and a second transmission structure; wherein the first transmission structure is electrically connected to one end of the first signal electrode, and the second transmission structure is electrically connected to the other end of the first signal electrode; and an antenna unit electrically connected to the second transmission structure, and the antenna further comprises: a first adapter structure;

wherein the first adapter structure comprises a fourth signal electrode, an eighth reference electrode and a ninth reference electrode on the dielectric substrate and having a same extending direction; the eighth reference electrode and the ninth reference electrode are respectively on two opposite sides of the fourth signal electrode; and the fourth signal electrode is electrically connected to the second signal electrode; and a distance between the eighth reference electrode and the ninth reference electrode is greater than that between the third reference electrode and the fourth reference electrode.

13. The antenna of claim 12, wherein the first adapter structure further comprises a tenth reference electrode on the second surface of the dielectric substrate; and orthographic projections of the fourth signal electrode, the eighth reference electrode and the ninth reference electrode on the dielectric substrate at least partially overlap with an orthographic projection of the tenth reference electrode on the dielectric substrate.

14. The antenna of claim 13, wherein the eighth reference electrode and the ninth reference electrode are electrically connected to the tenth reference electrode through vias extending through the dielectric substrate, respectively.

15. The antenna of claim 12, wherein the third reference electrode and the eighth reference electrode are of a unitary structure; the fourth reference electrode and the ninth reference electrode are of a unitary structure; and the second signal electrode and the fourth signal electrode are of a unitary structure.

16. An antenna, comprising:

a phase shifter, comprising: a dielectric substrate, a first signal electrode, a first reference electrode, a second reference electrode, an interlayer insulating layer, at least one phase control unit; wherein the dielectric substrate comprises a first surface and a second surface opposite to each other along a thickness direction of the dielectric substrate; extending directions of the first signal electrode, the first reference electrode, and the second reference electrode are the same; and the first signal electrode, the first reference electrode, and the second reference electrode are all on the first surface of the dielectric substrate, the first reference electrode and the second reference electrode are respectively on both sides of the first signal electrode; the interlayer insulating layer is on a side of the first signal electrode, the first reference electrode and the second reference electrode away from the dielectric substrate; each of the at least one phase control unit comprises at least one membrane bridge on a side of the interlayer insulating layer away from the dielectric substrate; the first signal electrode is at least partially in a space surrounded by the at least one membrane bridge and the dielectric substrate, and two ends of each of the at least one membrane bridge overlap with orthographic projections of the first reference electrode and the second reference electrode on the dielectric substrate, respectively;

a first transmission structure and a second transmission structure; wherein the first transmission structure is electrically connected to one end of the first signal electrode, and the second transmission structure is electrically connected to the other end of the first signal electrode; and an antenna unit electrically connected to the second transmission structure, and the antenna further comprises a first switch unit on the dielectric substrate for providing a bias voltage signal to the at least one membrane bridge upon receiving a first control signal; and wherein the first switch unit comprises a first switch transistor having a first electrode as a bias voltage input terminal of the first switch unit, a second electrode as a first output terminal of the first switch unit, and a control electrode as a first control terminal of the first switch unit, and the first switch transistor is configured to conduct the first electrode and the second electrode upon receiving the first control signal by the control electrode.

17. The antenna of claim 16, further comprising a second switch unit on the dielectric substrate for electrically connecting a signal line with the membrane bridges upon receiving a second control signal.

18. The antenna of claim 16, wherein the first switch unit is further configured to electrically connect a signal line with the membrane bridges upon receiving a second control signal.

* * * * *